United States Patent
Rebsdorf et al.

(10) Patent No.: US 6,566,764 B2
(45) Date of Patent: May 20, 2003

(54) VARIABLE SPEED WIND TURBINE HAVING A MATRIX CONVERTER

(75) Inventors: Anders V. Rebsdorf, Lemvig (DK); Lars Helle, Aalborg (DK)

(73) Assignee: Vestas Wind Systems A/S, R&D, Rinkobing (DK)

( * ) Notice: Subject to any disclaimer, the term of this patent is extended or adjusted under 35 U.S.C. 154(b) by 50 days.

(21) Appl. No.: 09/862,316

(22) Filed: May 23, 2001

(65) Prior Publication Data

US 2002/0079706 A1 Jun. 27, 2002

Related U.S. Application Data

(60) Provisional application No. 60/206,313, filed on May 23, 2000.

(51) Int. Cl.[7] .................................................. H02P 9/48
(52) U.S. Cl. ............................. 290/44; 290/55; 363/13
(58) Field of Search .............................. 290/43, 44, 54, 290/55; 322/29, 32; 363/13, 157, 159

(56) References Cited

U.S. PATENT DOCUMENTS

| | | | | |
|---|---|---|---|---|
| 3,832,625 A | * | 8/1974 | Guygyi | 322/47 |
| 4,251,735 A | * | 2/1981 | Coleman | 307/46 |
| 4,251,736 A | * | 2/1981 | Coleman | 307/46 |
| 4,352,155 A | * | 9/1982 | Guygyi | 363/163 |
| 4,426,192 A | * | 1/1984 | Chertok et al. | 416/1 |
| 4,439,823 A | * | 3/1984 | Gyugyi et al. | 363/161 |
| 4,468,725 A | * | 8/1984 | Venturini | 363/160 |
| 4,490,093 A | * | 12/1984 | Chertok et al. | 267/185 |
| 4,648,022 A | * | 3/1987 | Schauder | 363/159 |
| 4,695,736 A | * | 9/1987 | Doman et al. | 290/44 |
| 4,700,081 A | * | 10/1987 | Kos et al. | 290/44 |
| 4,703,189 A | * | 10/1987 | DiValentin et al. | 290/44 |
| 4,816,696 A | * | 3/1989 | Sakayori et al. | 290/52 |
| 4,891,744 A | * | 1/1990 | Yamamoto et al. | 363/89 |

(List continued on next page.)

FOREIGN PATENT DOCUMENTS

| | | |
|---|---|---|
| AU | A-90735/82 | 11/1981 |
| EP | 0 253 294 A2 | 1/1988 |
| WO | WO 92/14298 | 8/1992 |
| WO | WO 93/11604 | 6/1993 |
| WO | WO 96/13091 | 5/1996 |
| WO | WO 96/18937 | 6/1996 |
| WO | WO 96/29774 | 9/1996 |
| WO | WO 99/07996 | 2/1999 |
| WO | WO 99/44276 | 9/1999 |

OTHER PUBLICATIONS

Mohamed A. Abbas, et al., *Six–Phase Voltage Source Inverter Driven Induction Motor*, IEEE Transactions on Industry Applications, vol. IA–20, No. 5, Sep./Oct. 1984, pp. 1251–1259.

(List continued on next page.)

*Primary Examiner*—Nicholas Ponomarenko
(74) *Attorney, Agent, or Firm*—Finnegan, Henderson, Farabow, Garrett & Dunner LLP

(57) ABSTRACT

A variable speed wind turbine is disclosed comprising a turbine rotor that drives a doubly-fed induction generator, a matrix converter which converts variable frequency output into constant frequency output, and a control unit and a protection circuit for the matrix converter. Power is circulated in the system allowing for sensorless detection of rotor position and better output ratios of power from the system.

20 Claims, 16 Drawing Sheets

U.S. PATENT DOCUMENTS

| | | | | |
|---|---|---|---|---|
| 4,994,684 | A | * | 2/1991 | Lauw et al. .................. 290/52 |
| 5,029,064 | A | * | 7/1991 | Ball ............................ 363/65 |
| 5,083,039 | A | * | 1/1992 | Richardson et al. .......... 290/44 |
| 5,132,894 | A | * | 7/1992 | Rozman et al. ............... 363/51 |
| 5,155,375 | A | * | 10/1992 | Holley ........................ 290/44 |
| 5,172,310 | A | * | 12/1992 | Deam et al. ................ 363/144 |
| 5,187,427 | A | * | 2/1993 | Erdman ...................... 323/207 |
| 5,225,712 | A | * | 7/1993 | Erdman ........................ 290/44 |
| 5,278,773 | A | * | 1/1994 | Cousineau .................. 700/287 |
| 5,289,041 | A | * | 2/1994 | Holley ........................ 290/44 |
| 5,294,876 | A | * | 3/1994 | Jonsson ...................... 318/803 |
| 5,365,424 | A | * | 11/1994 | Deam et al. ................ 363/144 |
| 5,369,353 | A | * | 11/1994 | Erdman ...................... 323/207 |
| 5,373,433 | A | * | 12/1994 | Thomas ........................ 363/43 |
| 5,422,826 | A | * | 6/1995 | Cousineau .................. 700/287 |
| 5,526,252 | A | * | 6/1996 | Erdman ........................ 363/41 |
| 5,579,217 | A | * | 11/1996 | Deam et al. ................ 363/144 |
| 5,585,708 | A | * | 12/1996 | Richardson et al. ........ 318/800 |
| 5,594,636 | A | * | 1/1997 | Schauder .................... 363/160 |
| 5,669,470 | A | * | 9/1997 | Ross ............................ 191/10 |
| 5,729,118 | A | * | 3/1998 | Yanagisawa et al. ......... 322/29 |
| 5,798,631 | A | * | 8/1998 | Spee et al. ..................... 322/25 |
| 5,852,558 | A | * | 12/1998 | Julian et al. ................ 363/132 |
| 5,852,559 | A | * | 12/1998 | Li .............................. 363/163 |
| 5,892,677 | A | * | 4/1999 | Chang ........................ 363/152 |
| 5,909,367 | A | * | 6/1999 | Change ...................... 363/163 |
| 5,943,223 | A | * | 8/1999 | Pond ............................ 363/53 |
| 5,949,672 | A | * | 9/1999 | Bernet ........................ 363/159 |
| 5,977,569 | A | * | 11/1999 | Li .............................. 257/119 |
| 6,046,104 | A | * | 4/2000 | Cheng ........................ 388/835 |
| 6,137,187 | A | * | 10/2000 | Mikhail et al. ............... 290/44 |

OTHER PUBLICATIONS

Kasey W. Abbott, et al., *Darrieus Wind Turbine: Variable–Speed Operation*, Transactions of the ASAE, vol. 27, No. 1, Jan./Feb. 1984, pp. 265–272.

Hirofumi Akagi, et al., *Instantaneous Reactive Power Compensators Comprising Switching Devices without Energy Storage Components*, IEEE Transactions on Industry Applications, vol. IA–20, No. 3, May/Jun. 1984, pp. 625–630.

Alberto Alesina, et al., *Instrinsic Amplitudes and Optimum Design of Direct PWM AC—AC Converters*, IEEE Power Electronics Specialists Conference, 1988, pp. 1284–1291.

American Wind Energy Association, *Design Criteria Recommended Practices: Wind Energy Conversion Systems*, Design Criteria Subcommittee, AWEA Standards Program, Mar. 1988.

T. S. Andersen, et al., *Variable Speed Electrical Generator Systems for Large Wind Turbines*, Wind Energy Expo '82 and National Conference Proceedings, American Wind Energy Association, Amarillo, Texas, Oct. 24–27, 1982, pp. 33–37.

T. S. Andersen, et al., *Recent Advances in Variable Speed Electrical Generator Systems for Large Wind Turbines*, Wind Energy Expo '83 and National Conference Proceedings, American Wind Energy Association, San Francisco, CA, Oct. 17–19, 1983, pp. 27–33.

T. S. Andersen, et al., *Multi–Speed Electrical Generator Application to Wind Turbines*, AIAA/SERI Wind Energy Conference, Boulder, Colorado, Apr. 9–11, 1980, pp. 155–162.

D. Arsudis, et al., *Sensor–less Power Control of a Double–Fed AC–Machine with Nearly Sinusoidal Line Currents*, EPE Aachen, 1989, pp. 899–904.

D. Arsudis, *Double–Fed Three–Phase Generator with Voltage Link Converter in the Rotor Circuit for Wind Power Systems*, Doctorate Dissertation, Carolo–Wilhelmina Technical University, Jan. 12, 1989.

Robert S. Barton, *Variable Speed Generator Application on the MOD–5A 7.3 MW Wind Turbine Generator*, DOE/NASA Horizontal–Axis Wind Turbine Technology Workshop, May 8–10, 1994, Cleveland, Ohio, Collected Papers on Wind Turbine Technology, NASA, May 1995, pp. 199–210.

Robert S. Barton, et al., *Control System Design for the MOD–5A 7.3 MW Wind Turbine Generator*, DOE/NASA Horizontal–Axis Wind Turbine Technology Workshop, May 8–10, 1984, Cleveland, Ohio, pp. 157–174.

Robert S. Barton, et al., *Conceptual Design of the 6 MW MOD–5A Wind Turbine Generator*, Fifth Biennial Wind Energy Conference & Workshop (WWV), Washington, DC, Oct. 5–7, 1981, pp. 157–168.

R. R. Beasant, et al., *An Approach to Realization of a High Power Venturini Converter*, 1 IEEE Power Electronics Specialists Conference, Jun. 11, 1990, pp. 291–297.

Sandro Bertini, et al., *AC/DC/AC High Voltage Traction Drives with Quasi–Zero Reactive Power Demand*, IEEE Transactions on Power Electronics, vol. 8, No. 4, Oct. 1993, pp. 632–638.

M. J. Birks, *Directly Coupled, Slow Speed Wind Turbine Alternators*, $21^{st}$ Meeting of Experts—Electrical Systems for Wind Turbine with Constant and Variable Speed, Göteborg, Denmark, Oct. 7–8, 1991, pp. 15–24.

Boeing Engineering and Construction, *MOD–5B Wind Turbine System Concept and Preliminary Design Report*, vol. 1, Executive Summary, Sep. 1982.

Boeing Engineering and Construction, *MOD–5B Wind Turbine System Concept and Preliminary Design Report*, vol. 2, Detailed Report, Sep. 1982.

D. Boldin, et al., *Induction Generators Adapted to Variable Speed Operated Wind Turbines*, Proceedings of the European Wind Energy Conference, Oct. 22–26, 1984, Hamburg, Germany, pp. 542–547.

Bimal K. Bose, *Recent Advances in Power Electronics*, IEEE, 1990, pp. 829–838.

Bimal K. Bose, *Power Electronics and AC Drives*, Prenctice–Hall, 1986.

E. A. Bossanyi, et al., *Cost Effectiveness of Variable Speed Operation for Wind Turbines*, Proceedings of the $10^{th}$ British Wind Energy Association Conference, London, Mar. 22–24, 1988, pp. 431–438.

M. Braun, *Selbstgeführter Netzstromrichter mit Spannungsausgang und geringer Netzrückwirkung*, Siemens Forsch. –u. Entwickl.–Ber. Bd. 16 (1987) Nr. 2, pp. 55–58.

Nándor Burány, *Safe Control of Four–Quadrant Switches*, 1 IEEE Industrial Application Society Annual Meeting, Oct. 1–5, 1989, pp. 1190–1194.

Alfred Busse, et al., *Multiloop Control of a Unity Power Factor Fast Switching AC to DC Converter*, PESC '82, pp. 171–179.

S. C. Caldwell, et al., *The Frequency Converter Approach to a Variable Speed, Constant Frequency System*, AIEE Conference Paper #60–1076, AIEE Pacific General Meeting, San Diego, CA, Aug. 8–12, 1960.

N. G. Calvert, *Windpower Principles: Their Application on the Small Scale*, Charles Griffin & Company Ltd, 1981, pp. 115–120.

R. Carli, *Electricity Generation at Fixed Frequency with Variable Speed WECs*, Proceedings of the European Wind Energy Conference, Oct. 22–26, 1984, Hamburg, Germany, pp. 548–552.

P. W. Carlin, *Analysis of Variable Speed Operation of Horizontal Axis Wind Turbines*, Seventh ASME Wind Energy Symposium, 1988, p. 195.

O. Carlson, et al., *Variable Speed AC–Drive System with Pitch or Yaw Control*, Proceedings of Windpower '87, San Francisco, CA, Oct. 5–8, 1987, pp. 60–65.

O. Carlson, et al., *Variable Speed AC–Generators Applied in WECs*, Proceedings of the European Wind Energy Assocation Conference and Exhibition, vol. 1, Oct. 7–9, 1986, pp. 685–690.

Domenico Casadei, et al., *A General Approach for the Analysis of the Input Power Quality in Matrix Converters*, 2 IEEE Power Electronics Specialists Conference, Jun. 21–27, 1996, pp. 1128–1134.

Domenico Casadei, et al., *Performance of SVM Controlled Matrix Converter with Input and Output Unbalanced Conditions*, 2 EPE 6$^{th}$ European Conference on Power Electronics and Applications, Sep. 19–21, 1995, pp. 628–633.

Domenico Casadei, et al., *Reduction of the Input Current Harmonic Content in Matrix Converter Under Input/Output Unbalance*, 1 IEEE International Conference on Industrial Electronics, Control and Instrumentation, Nov. 9–14, 1995, pp. 457–462.

Domenico Casadei, et al., *The Use of Matrix Converters in Direct Torque Control of Induction Machines*, 24$^{th}$ Annual Conference of the IEEE Industrial Electronics Society, vol. 2/4, Aug. 31–Sep. 4, 1998, pp. 744–749.

Peter Caselitz, et al., *Windenergieanlagen im Verbundbetrieb: Kopplung und Regelung von arehzahivariablen Windenergieanlagen mit Gleichstrom–Sammelschiene,* Dec. 1985.

C. C. Chan, et al., *An Effective Method for Rotor Resistance Identification for High–Performance Induction Motor Vector Control*, IEEE Transactions on Industrial Electronics, vol. 37, No. 6, Dec. 1990, pp. 477–482.

Wang Cheng–xu, et al., *The Variable Speed and Constant Frequency Generating System with Slip Frequency Excitation and Computer Control*, Conference Publication, European Wind Energy Conference and Exhibition, 1989, pp. 795–798.

Hirotaka Chikaraishi, et al., *A Variable Speed Control of the Induction Generator without Speed Sensor for Wind Generation*, T. IEE Japan, vol. 110–D, No. 6, 1990, pp. 664–672.

Jung G. Cho, et al., *Soft Switched Matrix Converter for High Frequency Direct AC–to–AC Power Conversion*, Dept. of Electrical Engineering, Korea Advanced Institute of Science and Technology, 1991, pp. 196–201.

Edgar Conley P.E., *Variable Speed Wind Turbine Control System*, Proceedings of the 16$^{th}$ Intersociety Energy Conversion Engineering Conference, Atlanta, Georgia, vol. 3, Aug. 9–14, 1981, pp. 2243–2247.

J. A. N. de Bonte, *The Dutch Autonomous Wind Diesel System*, Proceedings of the European Wind Energy Conference, Oct. 22–26, 1984, Hamburg, Germany, pp. 685–689.

M. Depenbrock, *Direct Self–Control (DSC) of Inverter–Fed Induction Machine*, IEEE Transactions on Power Electronics, vol. 3, No. 4, Oct. 1988, pp. 420–429.

Von Rudolf Dirr, et al., *Neuartige elektronische Regeleinrichtungen für doppeltgespeiste Asynchronmotoren großer Leistung*, Siemens–Zeitschrift, 45, 1971, Heft 5, pp. 362–367.

Eugene DiValentin, *The Application of Broad Range Variable Speed for Wind Turbine Enhancement*, Proceedings of the European Wind Energy Association Conference and Exhibition, vol. 1, Oct. 7–9, 1986, pp. 669–674.

Juan W. Dixon, et al., *Characteristics of a Controlled–Current PWM Rectifier–Inverter Link*, IEEE Transactions on Industry Applications, vol. IA–23, No. 6, Nov./Dec. 1987, pp. 1022–1028.

Juan W. Dixon, et al., *Indirect Current Control of a Unity Power Factor Sinusoidal Current Boost Type Three–Phase Rectifier*, IEEE Transactions on Industrial Electronics, vol. 35, No. 4, Nov. 1988, pp. 508–515.

Glidden S. Doman, *Applications of Broad Range Variable Speed Generators to Large Horizontal Axis Wind Turbines*, Proceedings of Windpower '85, San Francisco, CA, Aug. 27–30, 1985, pp. 177–182.

Glidden S. Doman, *Economic Gains from More Complete System Integration of Variable Speed Generators and Lage Horizontal Axis Wind Turbines,* Proceedings of the 20$^{th}$ Intersociety Energy Conversion Engineering Conference, vol. 3, 1985, pp. 3.669–3.674.

Richard C. Dorf, *The Electrical Engineering Handbook,* 2$^{nd}$ Edition, CRC Press LLC, 1997, pp. 83–84.

David M. Eggleston, et al., *Wind Turbine Engineering Design*, Van Nostrand Reinhold, 1987.

Electrotek Concepts, Inc., *Testing Requirements for Variable–Speed Generating Technology for Wind Turbine Applications*, Electric Power Research Institute, May 1986.

P. Enjeti, et al., *A Critical Evaluation of Harmonics Generated by Forced Commutated Cycloconverters (FFC's) under Unbalance*, IEEE Industrial Application Society Annual Meeting, 1990, pp. 1162–1168.

J. Ernst, *Control of a Variable Speed Wind Energy Converter with a Synchronous Generator and a D.C. Link Converter*, Proceedings of the European Wind Energy Conference, Oct. 22–26, 1984, Hamburg, Germany, pp. 606–611.

J. Ernst, et al., *Optimization of the Energy Output of Variable Speed Wind Turbines*, Proceedings of Windpower '85, San Francisco, CA, Aug. 27–30, 1985, pp. 183–188.

H. Ertl, et al., *Analysis of Different Current Control Concepts for Forced Commutated Rectifier (FCR)*, PCI Proceedings, Jun. 1986, pp. 195–217.

A. A. Fardoun, et al., *A Variable–Speed, Direct–Drive Transmission Wind Power Plant*, Proceedings of Windpower '93, San Francisco, CA, Jul. 12–16, 1993, pp. 134–141.

E. F. Fuchs, et al., *Permanent–Magnet Machines for Operation with Large Speed Variations*, Proceedings of Windpower '92, Seatle, Washington, Oct. 19–23, 1992, pp. 291–299.

C. Gallo, et al., *Design and Dynamic Simulation of a Fixed Pitch 56 kW Wind Turbine Drive Train with a Continuously Variable Transmission*, NASA, Mar. 1986.

Luis J. Garcés, *Parameter Adaption for the Speed–Controlled Static AC Drive with a Squirrel–Cage Induction Motor*, IEEE Transactions on Industry Applications, vol. IA–16, No. 2, Mar./Apr. 1980, pp. 173–178.

P. Gardner, *Power Quality*, 21$^{st}$ Meeting of Experts—Electrical Systems for Wind Turbines with Constant or Variable Speed, Göteborg, Denmark, Oct. 7–8, 1991, pp. 25–35.

General Electric Company, "Conceptual Design Study for the Wind Turbine Hydro Pump–Back System", *Wind Power Plants for Electric Utility Systems in New York State*, Niagara Mohawk Power Corporation, Final Report, vol. 2, Oct. 1980.

Edward W. Golding, *The Generation of Electricity by Wind Power*, Philosophical Library, 1955, pp. 219–225.

Anders, Grauers, *Electric Efficiency of a Variable Speed Generator System*, 21$^{st}$ Meeting of Experts—Electrical Systems for Wind Turbines with Constant or Variable Speed, Göteborg, Denmark, Oct. 7–8, 1991, pp. 103–111.

Laszlo Gyugyi, *Reactive Power Generation and Control by Thyristor Circuits*, IEEE Transactions on Industry Applications, vol. IA–15, No. 5, Sep./Oct. 1979, pp. 521–532.

Thomas G. Habetler, et al., *Angle Controlled Current Regulated Rectifiers for AC/AC Converters*, IEEE Transactions on Power Electronics, vol. 6, No. 3, Jul. 1991, pp. 463–469.

Thomas G. Habetler, et al., *Control Strategies for Direct Torque Control Using Discrete Pulse Modulation*, IEEE Transactions on Industry Applications, vol. 27, No. 5, Sep./Oct. 1991, pp. 893–901.

B. F. Harbon, et al., *Wind–Turbine Power Improvement with Modern Airfoil Sections and Multiple–Speed Generators*, AIAA/SERI Wind Energy Conference, Boulder, Colorado, Apr. 9–11, 1980, pp. 130–147.

Karl–Erik Hallenius, *Elektriska Maskiner*, Bröderna Ekstrands Tryckeri AB Lund, 1984.

Fumio Harashima, et al., *Multimicroprocessor–Based Control System for Quick Response Induction Motor Drive*, IEEE Transactions on Industry Applications, vol. IA–21, No. 4, May/Jun. 1985, pp. 602–608.

C. D. Harbourt, *Pulse Width Modulated DC Link Converter Development*, Report No. AFWAL–TR–83–2046, Aero Propulsion Laboratory, Air Force Wright Aeronautical Lab, Wright–Patterson Air Force Base, Ohio, Jun. 1983.

Siegfried Heier, *Grid Influence by Wind Energy Converters*, 21$^{st}$ Meeting of Experts—Electrical Systems for Wind Turbines with Constant or Variable Speed, Göteborg, Denmark, Oct. 7–8, 1991, pp. 37–50.

H. L. Hey, et al., *A New Soft–Switching AC—AC Matrix Converter, with a Single Activated Commutation Auxiliary Circuit*, 2 IEEE Power Electronics Conference, Jun. 18–22, 1995, pp. 965–970.

Eric N. Hinrichsen, *Variable Rotor Speed for Wind Turbines: Objectives and Issues*, Proceedings of Windpower '85, San Francisco, CA, Aug. 27–30, 1985, pp. 164–170.

M. J. Hoeijmakers, *Synchronous Machine with Rectifier for Wind Turbines*, 21$^{st}$ Meeting of Experts—Electrical Systems for Wind Turbines with Constant or Variable Speed, Göteborg, Denmark, Oct. 7–8, 1991, pp. 51–61.

W. E. Holley, et al., *Optimal Quasistatic Control of Variable Speed Wind Turbines*, European Wind Energy Conference and Exhibition, Jul. 10–13, 1989, pp. 341–344.

D. G. Holmes, et al., *Implementation of a Controlled Rectifier Using AC—AC Matrix Converter Theory*, IEEE Power Electronics Specialists Conference, 1989, pp. 353–359.

G. Huβ, et al., *The Effect of Variable Rotor Speed on the Design and Operation of a WEC*, Proceedings of the European Wind Energy Conference, Oct. 22–26, 1984, Hamburg, Germany, pp. 308–313.

L. Huber, et al., *Space Vector Modulated Three–Phase to Three–Phase Matrix Converter with Input Power Factor Correction*, 31 IEEE transactions on industry applications, No. 6, Nov./Dec. 1995, pp. 1234–1246.

L. Huber, et al., *Space Vector Modulation with Unity Input Power Factor for Forced Commutated Cycloconverters*, IEEE Industrial Application Society Annual Meeting, 1991, pp. 1032–1041.

V. Daniel Hunt, *Windpower: a Handbook on Wind Energy Conversion Systems*, Van Nostrand Reinhold Company, 1981.

Maria G. Ioannides, et al., *Generalized Optimization Slip Power Recovery Drives*, IEEE Transactions on Energy Conversion, vol. 5, No. 1, Mar. 1990, pp. 91–95.

Rainer Jäger, *Leistungselektronik: Grundlagen und Anwendungen*, pp. 308–309.

N. Jenkins, *Electrical Variable Speed Operation of Horizontal Axis Wind Turbine Generators*, 21$^{st}$ Meeting of Experts—Electrical Systems for Wind Turbines with Constant or Variable Speed, Göteborg, Denmark, Oct. 7–8, 1991, pp. 63–68.

N. Jenkins, *IEA Meeting at Chalmers University Gothenburg, Oct. 7–8, 1991, Notes on Final Discussion*, 21$^{st}$ Meeting of Experts—Electrical Systems for Wind Turbines with Constant or Variable Speed, Göteborg, Denmark, Oct. 7–8, 1991, pp. 153–154.

Yorito, Jifuku, et al., *GTO Inverter for Adjustable Speed AC Motor Drive System*, IPEC—Tokyo '83, pp. 418–425.

William R. Johnson, *Design, Construction and Early Operation of the 3.2–MW MOD–5B Wind Turbine*, Proceedings of Windpower '87, San Francisco, CA, Oct. 5–8, 1987, pp. 1–6.

S. Kawamura, et al., *The Operating Characteristics of Mechanical Governor for a Variable–Speed Wind Turbine Generator*, Proceedings of the European Community Wind Energy Conference, Madrid, Spain, Sep. 10–14, 1990, pp. 547–551.

M. P. Kazmierkowski, et al., *Novel Space Vector Based Current Controllers for PWM–Inverters*, IEEE, 1989, pp. 657–664.

Y. Kim, et al., *Control of Force–Commutated Direct Frequency Changers*, IEEE Industrial Application Society Annual Meeting, 1990, pp. 1163–1170.

Y. Kim, et al., *New Modulation Methods for Force–Commutated Direct Frequency Changers*, IEEE Power Electronics Specialists Conference, 1989, pp. 798–809.

C. T. Kleiner, *Advanced Semiconductor Technology for Alternative Energy Sources—D–C to A–C Inverters*, Alternative Energy Sources Symposium, Miami Beach, Florida, Dec. 5–7, 1977.

H. Kohlmeier, et al., *Control of a Double Voltage Inverter System Coupling a Three Phase Mains with an AC–Drive*, IEEE/IAS Annual Meeting Conference Rec., 1987, pp. 593–599.

H. Kohlmeier, et al., *GTO–Pulse Inverters with On–Line Optimized Pulse Patterns for Current Control*, pp. 668–671.

H. Kohlmeier, et al., *Highly Dynamic Four–Quadrant AC Motor Drive with Improved Power Factor and On–Line Optimized Pulse Pattern with PROMC*, IEEE Transactions on Industry Applications, vol. IA–23, No. 6, Nov./Dec. 1987, pp. 1001–1009.

Ulrik Krabbe, *The Electric Power Equipment for the Windmill in Tvind*, Report No. AE–R–015, Laboratory of Electric Circuits and Machines, 1979.

Ashok B. Kulkarni, et al., *Transient Tests on a Voltage-–Regulated Controlled–Current PWM Converter*, IEEE Transactions on Industrial Electronics, vol. IE–34, No. 3, Aug. 1987, pp. 319–324.

B. H. Kwon, et al., *Novel Commutation Technique of AC–AC Converters*, 145 IEE Proceedings on Electronic Power Application, Jul. 1998, pp. 295–300.

T. H. Lauw, *AC–DC–AC Conversion System for Mains–Connected Windpower Generation*, Second ASME Wind Energy Symposium, 6$^{th}$ Annual Energy–Sources Technology Conference and Exhibition, Houston, Texas, Jan. 30–Feb. 3, 1983, pp. 193–204.

S. Lefebvre, et al., *Control of a Variable–Speed Wind Turbine Generator*, Proceedings of the Ninth Biennial Congress of the International Solar Energy Society, vol. 4, Pergamon Press, pp. 2147–2151.

Werner Leonhard, et al., *Betriebsverhalten von Windenergieanlagen*, Bundesministerium für Forschung und Technologie, Jul. 1984.

Seymour Lieblein, Ed., *Large Wind Turbine Design Characteristics and R&D Requirements*, NASA Conference Publication 2106, DOE Publication CONF–7904111, Apr. 24–26, 1979.

Barry Liebowitz, *Wind Technology Assessment*, New York State Energy Research and Development Authority, Jul. 1991.

Thomas A. Lipo, *Investigation of Variable Speed for Wind Turbine Power Generation*.

Thomas A. Lipo, *Recent Progress in the Development of Solid State AC Motor Drives*, Proceedings of Electric Energy Conference, Adelaide, Australia, Oct. 6–9, 1987.

James P. Lyons Jr., et al., *The Control of Variable–Speed Wind Turbine Generators*, Proceedings of the 22$^{nd}$ IEEE Conference on Decision and Control, vol. 3, San Antonio, Texas, Dec. 16, 1983, pp. 1417–1421.

Luigi Malesani, et al., *Three–Phase AC/DC PWM Converter with Sinusoidal AC Currents and Minimum Filter Requirements*, IEEE Transactions on Industry Applications, vol. IA–23, No. 1, Jan./Feb. 1987, pp. 71–77.

J. F. Manwell, et al., *Electrical/Mechanical Options for Variable Speed Wind Turbines*, Solar Energy, vol. 46, No. 1, 1991, pp. 41–51.

J. F. Manwell, et al., *Review of Hardware Options for Variable Speed Wind Turbines*, Proceedings of the 1989 Annual Conference of the American Solar Energy Society, Denver, Colorado, Jun. 19–22, 1989, pp. 37–47.

G. D. Marques, *Synthesis of Active and Reactive Power Controllers for the Slip Power Recovery Drive*, EPE Aachen, 1989, pp. 829–833.

H. Matsumiya, et al., *A 15 Meter Diameter Variable–Speed HAWT: A Research Machine of Japanese National SUNSHINE Project*, Proceedings of Windpower '88, Honolulu, Hawaii, Sep. 18–22, 1988, pp. 135–144.

Takayoshi Matsuo, et al., *A Rotor Parameter Identification Scheme for Vector–Controlled Induction Motor Drives*, IEEE Transactions on Industry Applications, vol. IA–21, No. 4, May/Jun. 1985, pp. 624–632.

Tomoyuki Matsuzaka, et al., *A Variable Speed Wind Generating System and Its Test Results*, Conference Publication, European Wind Energy Conference and Exhibition, 1989, pp. 608–612.

G. McNerney, *The Effect of Variable Speed Operation on the Cost of Energy of a WECS*, Ninth ASME Wind Energy Symposium, 13$^{th}$ Annual Energy–Sources Technology Conference and Exhibition, New Orleans, Louisiana, Jan. 14–18, 1990, pp. 201–203.

G. McNerney, et al., *The EPRI–Utility–USW Advanced Wind Turbine Program—1990 Update*, Proceedings of Windpower '90, Washington, DC, Sep. 24–28, 1990, pp. 79–84.

T. J. E. Miller, *Reactive Power Control in Electric Systems*, John Wiley & Sons, 1982.

Ned Mohan, et al., *Power Electronics: Converters, Applications, and Design*, John Wiley & Sons, 1989, Chapters 16 and 17, pp. 386–431.

Luis T. Moran, et al., *Analysis and Design of a Novel 3–ø Solid–State Power Factor Compensator and Harmonic Suppressor System*, IEEE Transactions on Industry Applications, vol. 25, No. 4, Jul./Aug. 1989, pp. 609–619.

Luis T. Moran, et al., *Analysis and Design of a Three–Phase Current Source Solid–State Var Compensator*, IEEE Transactions on Industry Applications, vol. 25, No. 2, Mar./Apr. 1989, pp. 356–365.

Luis T. Moran, et al., *Analysis and Design of a Three–Phase Synchronous Solid–State Var Compensator*, IEEE Transactions on Industry Applications, vol. 25, No. 4, Jul./Aug. 1989, pp. 598–608.

Eduard Muljadi, *Series Compensated PWM Inverter with Battery Supply Applied to an Isolated Induction Generator*, Ph.D. Thesis, University of Wisconsin–Madison, 1987.

G. A. Mutone, et al., *Hybrid Computer Simulation of Variable Speed Wind Turbine Generator*, Proceedings of the 14$^{th}$ Annual Pittsburgh Conference, University of Pittsburgh, Apr. 21–22, 1983, Instrument Society of America, pp. 159–165.

D. O. Neascu, *Theory and Design of a Space–Vector Modulator for AC—AC Matrix Converter*, 5 European Transactions on Electrical Power Engineering, No. 4, Jul. / Aug. 1995, pp. 285–290.

Charles L. Neft, et al., *Theory and Design of a 30–HP Matrix Converter*, IEEE Industry Applications Society Annual Meeting, 1988, pp. 934–939.

W. R. Nickols, et al., *Development of the Aldborough Wind Turbine*, Third International Conference on Future Energy Concepts, London, England, Jan. 27–30, 1981, pp. 277–281.

P. Nielsen, et al., *Evaluation of the Input Current Quality by Three Different Modulation Strategies for SVM Controlled Matrix Converters with Input Voltage Unbalance*, 2 IEEE International Conference on Power Electronics, Drives and Energy Systems for Industrial Growth, Jan. 1996, pp. 794–800.

P. Nielsen, et al., *Novel Solutions for Protection of Matrix Converter to Three Phase Induction Machine*, IEEE Industry Applications Conference, 1997, pp. 1447–1454.

P. Nielsen, et al., *Space Vector Modulated Matrix Converter with Minimized Number of Switchings and a Feedforward Compensation of Input Voltage Unbalance*, IEEE International Conference on Power Electronics, Drives and Energy Systems for Industrial Growth, vol. 2, Jan. 1996, pp. 833–839.

P. Nielsen, *The Matrix Converter for an Induction Motor Drive*, Ph.D. Thesis, Aalborg University, Aug. 1996.

O. Niermeyer, *AC–Motor Drive with Regenerative Braking and Reduced Supply Line Distortion*, EPE Aachen, 1989, pp. 1021–1026.

D. W. Novotny, *A Comparative Study of Variable Frequency Drives for Energy Conservation Applications*, University of Wisconsin–Madison, Apr. 1981.

Toshiaki Okuyama, et al., *High Performance AC Motor Speed Control System Using GTO Converters*, IPEC—Tokyo '83, pp. 720–731.

Boon Teck Ooi, et al., *Induction–Generator/Synchronous-–Condenser System for Wind–Turbine Power*, Proc. IEE, vol. 126, No. 1, Jan. 1979, pp. 69–74.

Boon Teck Ooi, et al., *An Integrated AC Drive System Using a Controlled–Current PWM Rectifier / Inverter Link*, IEEE Transactions on Power Electronics, vol. 3, No. 1, Jan. 1988, pp. 64–71.

Boon Teck Ooi, et al., *A Three–Phase Controlled–Current PWM Converter with Leading Power Factor*, IEEE Transactions on Industry Applications, vol. IA–23, No. 1, Jan./Feb. 1987, pp. 78–84.

J. Oyama, et al., *Displacement Angle Control of Matrix Converter*, 2 IEEE Power Electronic Specialists Conference, Jun. 22–27, 1997, pp. 1033–1039.

J. Oyama, et al., *Effect of PWM Pulse Number on Matrix Converter Characteristics*, 2 IEEE Power Electronics Specialists Conference, Jun. 23–27, 1996, pp. 1306–1311.

Gerald L. Park, et al., *Measured Interconnected Behavior of Wind Turbine Inverters*, IEEE Transactions on Power Apparatus and Systems, vol. PAS–103, No. 10, Oct. 1984, pp. 3074–3079.

K. N. Pavithran, et al., *Studies on Inverter–Fed Five–Phase Induction Motor Drive*, IEEE Transactions on Power Electronics, vol. 3, No. 2, Apr. 1988, pp. 224–235.

J. T. G. Pierik, et al., *A Variable Speed System with Integral Control for Wind Turbines (IRFLET): Design of the Test–Rig.*, $21^{st}$ Meeting of Experts—Electrical Systems for Wind Turbines with Constant or Variable Speed, Göteborg, Denmark, Oct. 7–8, 1991, pp. 69–80.

G. Raina, et al., *Variable Speed Wind Energy Conversion Using Synchronous Machine*, IEEE Transactions on Aerospace and Electronic Systems, vol. AES–21, No. 1, Jan. 1985, pp. 100–105.

G. Raina, et al., *Wind Energy Conversion Using a Self–Excited Induction Generator*, IEEE Transactions on Power Apparatus and Systems, vol. PAS–102, No. 12, Dec. 1983, pp. 3933–3936.

Mark E. Ralph, *Control of the Variable Speed Generator on the Sandia 34–Metre Vertical Axis Wind Turbine*, Proceedings of Windpower '89, San Francisco, CA, Sep. 24–27, 1989, pp. 99–104.

Mark E. Ralph, *Design and Control of a Variable–Speed Generator System for a WECS*, Proceedings of Windpower '87, San Francisco, Oct. 5–8, 1987, pp. 55–59.

T. W. Reddoch, et al., *A Conceptual Framework for Evaluating Variable Speed Generator Options for Wind Energy Applications*, Collected Papers on Wind Turbine Technology, NASA, May 1995, pp. 185–190.

Von Theodor Salzmann, *Direktumrichter und Regelkonzept für getriebelose Antrieb von Rohrmühlen*, Siemens–Zeitschrift 51, Heft 5, 1977, pp. 416–422.

Noriaki Sato, *Induction Generator Connected to a Utility Network through a Static Frequency Changer*, pp. 609–616.

William C. Schmidt, et al., *Evaluating Variable Speed Generating Systems on the DOE/NASA MOD–0 Wind Turbine*, Proceedings of Windpower '85, San Francisco, CA, Aug. 27–30, 1985, pp. 171–176.

Daniel M. Simmons, *Wind Power*, Noyes Data Corporation, 1975, pp. 111–129.

G. A. Smith, et al., *A Variable–Speed Constant–Frequency Induction Generator for Sub and Supersynchronous Operation*, Proceedings of the European Wind Energy Association Conference and Exhibition, Rome, Italy, vol. 2, Oct. 7–9, 1986, pp. 51–55.

René Spée, et al., *Adaptive Control Strategies for Variable–Speed Doubly–fed Wind Power Generation Systems*, Feb. 10, 1994.

William Stein, et al., *Development of an Experimental Hybrid Power System Incorporating a Variable Speed Diesel Generator*, Proceedings of Windpower '94, Minneapolis, Minnesota, May 1994, pp. 211–219.

M. Steinbuch, *Dynamic Modeling and Analysis of a Wind Turbine with Variable Speed*, Journal A, vol. 27, No. 1, Jan. 1986, pp. 1–8.

M. Steinbuch, *Optimal Multivariable Control of a Wind Turbine with Variable Speed*, Proceedings of the European Wind Energy Association Conference and Exhibition, Rome, Italy, vol. 1, Oct. 7–9, 1986, pp. 623–628.

C. Stork, et al., *Criteria for the Choice of a Variable Speed Strategy in the Design of a Single Bladed Wind Turbine*, $21^{st}$ Meeting of Experts—Electrical Systems for Wind Turbines with Constant or Variable Speed, Göteborg, Denmark, Oct. 7–8, 1991, pp. 81–86.

Hidehiko Sugimoto, et al., *A High Performance Control Method of a Voltage–Type PWM Converter*, PESC '88 Record, Apr. 1988, pp. 360–368.

A. Swift, *The Effects of Turbulence on the Performance of Both Variable, and Constant Rotor Speed Wind Turbines*, Fourth ASME Wind Energy Symposium, pp. 131–138.

Isao Takahashi, et al., *A New Quick–Response and High–Efficiency Control Strategy of an Induction Motor*, IEEE Transactions on Industry Applications, vol. IA–22, No. 5, Sep./Oct. 1986, pp. 820–827.

Yifan Tang, et al., *A Flexible Active and Reactive Power Control Strategy for a Variable Speed Constant Frequency Generating System*, IEEE Transactions on Power Electronics, vol. 10, No. 4, Jul. 1995, pp. 472–478.

Torbjörn Thiringer, et al., *Power Control of a Fixed–Pitch Variable Speed Wind Turbine*, $21^{st}$ Meeting of Experts—Electrical Sysetms for Wind Turbines with Constant or Variable Speed, Göteborg, Denmark, Oct. 7–8, 1991, pp. 87–93.

K. Thiyagarajah, et al., *A High Switching Frequency IGBT PWM Rectifier/Inverter System for AC Motor Drives Operating from Single Phase Supply*, IEEE, 1990, pp. 663–671.

Kjeld Thorborg, *Power Electronics*, Prentice Hall, 1988, pp. 209–211.

Kjeld Thorborg, *Power Electronics*, $2^{nd}$ Ed., S. T. Teknik, Sweden, 1985, pp. 6:36–6:41.

Hamid A. Toliyat, et al., *Analysis of a Concentrated Winding Induction Machine for Adjustable Speed Drive Applications: Part 2 (Motor Design and Performance)*, IEEE Transactions on Energy Conversion, vol. 6, No. 4, Dec. 1991, pp. 684–692.

David A. Torrey, et al., *A Variable–Speed Wind Turbine Based on a Direct–Drive Variable–Reluctance Generator*, Proceedings of Windpower '94, Minneapolis, Minnesota, May 1994, pp. 513–522.

Spiros Tsiolis, et al., *An Electrical System for Variable Speed Operation of Wind Turbines with Induction Generators*, Proceedings of Windpower '91, Palm Springs, CA, Sep. 24–27, 1991, pp. 170–177.

W. A. Vachon, *The Effect of Controls on Life and Energy Production of the 34–m VAWT Test Bed*, Eighth ASME Wind Energy Symposium (D.E. Berg et al. eds), 1989, pp. 209–218.

W. A. Vachon, *Smart Control Algorithms for Operation of Variable–Speed Wind Turbines*, Ninth ASME Wind Energy Symposium (D.E. Berg ed.), Thirteenth Annual Energy-–Sources Technology Conference and Exhibition, New Orleans, Louisiana, Jan. 14–18, 1990, pp. 191–199.

G. P. Valter, *A Comparison between Constant Speed and Variable Speed Conversion Systems for Windturbine Operation*, Proceedings of Windpower '85, San Francisco, CA, Aug. 27–30, 1985, pp. 592–597.

Heinz W. van Der Broeck, et al., *A Comparative Investigation of a Three–Phase Induction Machine Drive with a Component Minimized Voltage–Fed Inverter under Different Control Options*, IEEE Transactions on Industry Applications, vol. IA–20, No. 2, Mar./Apr. 1984, pp. 309–320.

Jacobus D. van Wyk, et al., *Simulation and Experimental Study of a Reactively Loaded PWM Converter as a Fast Source of Reactive Power*, IEEE Transactions on Industry Applications, vol. IA–22, No. 6, Nov./Dec. 1986, pp. 1082–1089.

Jacobus D. van Wyk, et al., *A Study of a Wind Power Converter with Microcomputer Based Maximal Power Control Utilizing an Oversynchronous Electronic Scherbius Cascade*, IPEC—Tokyo '83, pp. 766–777.

C. Velayudhan, et al., *A Variable–Speed, Constant–Frequency Wind Power Generation Scheme Using a Slip–Ring Induction Generator*, $19^{th}$ Annual Intersociety Energy Conversion Engineering Conference, vol. 4, San Francisco, CA, Aug. 19–24, 1984, pp. 2313–2318.

Marco Venturini, *A New Sine Wave In, Sine Wave Out Conversion Technique Eliminates Reactive Elements*, Powercon 7., Mar. 24–27, 1980, pp. E3–1–E3–15.

Donato Vincenti, et al., *A PC–Based Pulse–Width Modulator for Static Converters*, IEEE, 1990, pp. 57–71.

W. Vollstedt, *Variable–Speed Wind Turbine Generator with Low Line Interactions*, $21^{st}$ Meeting of Experts—Electrical Systems for Wind Turbines with Constant or Variable Speed, Göteborg, Denmark, Oct. 7–8, 1991, pp. 127–138.

Otto Warneke, *Einsatz einer doppeltgespeisten Asynchronmaschine in der großen Windenergieanlage Growian*, Siemens–Energietechnik 5, Heft 6, 1983, pp. 364–367.

C. Watthanasarn, et al., *Analysis and DSP–Based Implementation of Modulation Algorithms for AC—AC Matrix Converters*, 2 IEEE Power Electronics Specialists Conference, Jun. 21–27, 1996, pp. 1053–1058.

Claus H. Weigand, et al., *Variable Speed Wind Generation: Electrical Options and Power System Issues*, Proceedings of Windpower '94, Minneapolis, Minnesota, May 1994, pp. 239–250.

Eugenio Wernekinck, et al., *A High Frequency AC/DC Converter with Unity Power Factor and Minimum Harmonic Distortion*, IEEE Transactions on Power Electronics, vol. 6, No. 3, Jul. 1991, pp. 364–370.

James W. A. Wilson, *The Forced–Commutated Inverter as a Regenerative Rectifier*, IEEE Transactions on Industry Applications, vol. IA–14, No. 4, Jul./Aug. 1978, pp. 335–340.

Wind Energy Group, *Options for Variable Speed Operation of Horizontal Axis Wind Turbine Generators*, Crown, 1989.

E. C. Woychik, et al., *Reducing the Costs of Wind Power: the Variable Speed Isosynchronous Generator*, Proceedings of Windpower '85, San Francisco, CA, Aug. 27–30, 1985, pp. 576–582.

Rusong Wu, et al., *Analysis of a PWM AC to DC Voltage Source Converter Under Predicted Current Control with Fixed Switching Frequency*, IEEE Transactions on Industry Applications, vol. 27, No. 4, Jul./Aug., 1991, pp. 756–764.

Longya Xu, *Torque and Reactive Power Control of a Doubly Fed Induction Machine by Position Sensorless Scheme*, IEE Transaactions on Insdutry Applications, vol. 31, No. 3, May/Jun. 1995, pp. 635–642.

S. R. Yadavalli, et al., *A New Generation Scheme for Large Wind Energy Conversion Systems*, Eleventh Intersociety Energy Conversion Engineering Conference Proceedings, vol. II, State Line, Nevada, Sep. 12–17, 1976, pp. 1761–1765.

Mitsutoshi Yamamoto, et al., *Active and Reactive Power Control for Doubly–Fed Wound Rotor Induction Generator*, IEEE, 1990, pp. 455–460.

P. Zanotti, *A Converter System for the Gamma 60 Variable Speed Wind Turbine: Main Features and Expected Performances*, $21^{st}$ Meeting of Experts—Electrical Systems for Wind Turbines with Constant or Variable Speed, Göteborg, Denmark, Oct. 7–8, 1991, pp. 139–151.

L. Zhang, et al., *A Matrix Converter Excited Doubly–Fed Induction Machine as Wind Power Generator*, IEE Power Electronics and Variable Speed Drives, Conference Publication No. 456, Sep. 21–23, 1998, pp. 532–537.

L. Zhang, et al., *An Efficient Space Vector Modulation Algorithm for AC—AC Matrix Converters*, IEE Power Electronics and Variable Speed Drives, Sep. 21–25, 1996, pp. 108–113.

L. Zhang, et al., *Analysis and Comparison of Control Techniques for AC—AC Matrix Converters*, 145 IEE Proceedings on Electronic Power Application, Jul. 1998, pp. 284–294.

L. Zhang, et al., *Application of a Matrix Converter for the Power Control of a Variable–Speed Wind–Turbine Driving a Doubly–Fed Induction Generator*, 1997, pp. 906–911.

Donald S. Zinger, *Induction Motor Speed Control Using Tapped Stator Windings*.

Phoivos D. Ziogas, et al., *Rectifier–Inverter Frequency Changers with Suppressed DC Link Components*, IEEE Transactions on Industry Applications, vol. IA–22, No. 6, Nov./Dec. 1986, pp. 1027–1036.

* cited by examiner

VARIABLE SPEED WIND TURBINE HAVING A MATRIX CONVERTER

Applicants claim the right to priority based on Provisional Patent Application No. 60/206,313 filed May 23, 2000.

FIELD OF THE INVENTION

The present invention relates to supplying a utility with power from a variable speed wind turbine, and, more particularly, to converting a variable frequency output from a generator directly into constant frequency using a matrix converter.

BACKGROUND OF THE INVENTION

Wind speed fluctuates over time. Some wind turbines are not able to track these fluctuations and rotate only at a single speed (frequency). A way of operating at a fixed speed despite variations in wind speed is to use a synchronous generator or a directly connected induction (asynchronous) generator.

Since the maximum power available from the wind is a function of wind speed, and since the power captured by a propeller of a wind turbine is a function by rotor speed and wind speed, fixed speed wind turbines fail to recover this maximum power. Fixed speed turbines also suffer from noise, reliability problems and high stresses on the utility grid. Furthermore the lagging power factor of a grid-connected asynchronous generator demands a large capacitor battery to compensate for the lagging power factor. Accordingly, variable speed implementations have been proposed to recover the maximum power of the wind and better address these other problems of fixed speed turbines. Examples of these variable speed wind turbines are described in U.S. Pat. Nos. 5,083,039 and 5,225,712, and PCT Application U.S. Ser. No. 99/07996, each of which is incorporated by reference herein in its entirety.

A variable speed wind turbine 100 is also shown in FIG. 1. One or more wind turbine blades (not shown) drives rotor shaft 111 of asynchronous doubly-fed induction generator 110. Turbine 100 supplies power from rotor 112 and stator 113 of generator 110 when shaft 111 is rotating above synchronous speed. At speeds above synchronous speed, excitation power may be supplied to rotor 112 from rotor inverter 151 in order to achieve unity power factor at the stator side. At shaft speeds lower than synchronous speed, power is supplied from stator 113 and slip power along with the excitation power is supplied to rotor 112 from rotor inverter 151.

To supply power from stator 113, Y/Δ-contacter 130 shifts the three stator windings selectively into a Y-connection or a Δ-connection. FIG. 1A shows the Y-connection and FIG. 1B shows the Δ-connection of the stator windings. The purpose of Y/Δ-switch 130 is to achieve a higher operational speed range and to reduce iron losses in the stator. Iron loss is a loss mechanism similar to the ohmic losses of a resistor. (In a generator, the ohmic losses are called copper losses). The iron loss originates both from eddy currents and hysteresis losses. Eddy currents are currents induced in the iron of the generator while hysteresis loss occurs when magnetic energy is stored and removed from the generator iron. The magnitude of the iron losses depends on the voltage across the windings, and since the voltage across the stator windings in a Y-connection is decreased by a factor of √3, the iron losses will decrease. Specifically, for a given stator and rotor voltage, the speed range in Y-connection is increased by a factor of √3 compared to the speed range in Δ-connection. For example, if the speed range in Δ-connection is ±36% around synchronous speed, the speed range is extended to ±52% around synchronous speed when connecting the generator in Y-connection. This increased speed and frequency range is derived from analysis of the following relationship between the rotor voltages and the stator voltages:

$$u_r = |s| \cdot u_s \cdot n \tag{1}$$

where $u_s$ is the voltage across the stator winding, $u_r$ is the voltage across the rotor winding, n is the winding ratio between rotor and stator, and s is the slip.

The output voltage and current from the stator are fed into a medium voltage transformer. The transformer may be located in the top of the turbine or elsewhere. When a transformer is located in the top of a turbine, the transformer can be constructed in at least two ways. The first way is with a primary winding (10 kV) and a secondary winding (690V) and a special tap on the secondary winding (480V). The second way is with a primary winding (10 kV) and a secondary winding (690V) and a tertiary winding (480V). When the medium voltage transformer is not in the top of the turbine, there is still a need for the converter voltage level (480V), and that can also be implemented in several ways, such as either having a transformer with primary winding (690V) and secondary winding (480V) or having a autotransformer with one active winding (690V) but a secondary tap (480V). The medium voltage transformer steps up the voltage to an amount, for example 10 kV at the primary side, required for a power supply, such as a utility grid. The contactor 113, however, is only exemplary and the stator windings can be directly connected to transformer 170 in either Y-connection or Δ-connection. Further, the output from stator 113 can be connected directly to the utility grid or to a separate transformer, instead of transformer 170.

To supply power to/from rotor 112, current induced in rotor 112 is passed through an output filter 140, which is designed to prevent large voltage changes across the generator windings and thereby increase the lifetime of the winding insulation, and then is passed to a back-to-back indirect power converter 150. Power converter 150 includes a converter stage 151, which converts the variable frequency output of generator 110 to a DC voltage, a DC link 152, including an electrolytic capacitance 153, and a converter stage 154, which converts the DC link voltage into a fixed frequency output. The output of converter 154 is fed to a filter 160, which smoothes the current to be supplied and boosts the DC-link voltage. To reduce the voltage ratings of the switches included in converters 151 and 154, the filtered fixed-frequency output is applied to the low-voltage, tertiary windings of transformer 170, for example 480 V.

In accordance with FIG. 1 and assuming ideal components:

$$P_m = P_r + P_s = sP_s + P_s \text{ where } s = \frac{\omega_r - \omega_s}{\omega_s} \tag{2}$$

$$P_r = \frac{sP_m}{1+s} \tag{3}$$

where $P_m$ is the mechanical input power from the wind, $P_r$ is the power supplied from the rotor circuit, $P_s$ is the power supplied from the stator, and $\omega_r$ and $\omega_s$ are the angular frequency of the rotor shaft and the stator field, respectively.

The configuration of FIG. 1, which uses doubly-fed induction generator 110 and indirect power conversion circuit 150, has certain disadvantages. In the turbine of FIG. 1, the switches in the rotor inverter 151 have to be designed to withstand the full load conditions at synchronous speed. At synchronous speed or near synchronous speed, high thermal stress on the switches in the rotor inverter occur because the load on the switches is unequally distributed. As an example, a generator may be running at synchronous speed and delivering a maximum power $P_m$ of 2 MW. At synchronous speed the rotor current Ir is direct current with a frequency of 0 Hz·$I_r$ is calculated as:

$$I_r = \frac{I_s}{n \cdot \cos(\phi_n)} \quad (4)$$

where n is the winding ratio between rotor and stator, $I_s$ is the stator current, and $\cos(\phi_n)$ is the nominal displacement angle of the generator when the rotor is short circuited. The maximum stator current $I_s$ at synchronous speed is given by:

$$I_s = \frac{P_{max}}{U_s \cdot \sqrt{3}} \quad (5)$$

where $U_s$ is the line-line stator voltage. A typical stator voltage for a wind turbine that produces 2 MW is 690V. Using equation 4 and equation 5, the rotor current is 707 A, assuming a ratio n=2.63 and $\cos((\phi_n))$=0.9. At synchronous speed, the currents in the rotor windings have DC-values, and the current in a specific winding can assume any arbitrary DC-value between zero and 707·$\sqrt{2}$. In a worst case scenario, one of the three windings carries a DC-current of 707·$\sqrt{2}$ while the two windings each carry half (707·$\sqrt{2}/2$) of the current but with the opposite sign. (The sum of the rotor currents must at all times equal zero due to the Y-connection of the rotor windings.) At a shaft speed matching synchronous speed, the applied rotor voltage is close to zero. Consequently, the control vectors for the switches in converter 151 are mostly zero-vectors, i.e., either the upper switches of rotor converter 151 are conducting or the lower switches of rotor converter 151 are conducting most of the time. A situation where the upper switches are conducting is shown in FIG. 1C. Hence, each switch in the rotor inverter must be thermally rated to withstand a current of $\sqrt{2}$·707 for a given time period while the current ratings at nominal frequency should be 707/$\sqrt{2}$ meaning a factor 2 in difference.

An additional disadvantage of the FIG. 1 configuration is that capacitance 153 may reduce the efficiency and lifetime of power converter 150. The switches of converter 150 provide only two output levels when coupled to the DC-voltage. As a result, a large filter 160 is needed to reduce harmonic content in the supplied power. Moreover, the harmonic content at the generator side of converter 150 is also high. As a result, a larger filter is required to prevent high voltage changes across the generator windings from causing damage to winding insulation in generator 110.

Matrix converters can also be called either venturini converters or direct frequency converters. Some wind turbines have used matrix converters to eliminate intermediate conversion using a DC link. These wind turbines, however, do not use an actively controlled matrix converter. Prototype wind turbines that have used matrix converters are designed to produce only about 7.5 kW of electricity. A viable design using a matrix converter in a wind turbine to produce electricity at higher power levels has yet to be achieved.

Other documents describe wind turbines and/or direct frequency converters. For example, U.S. Pat. No. 6,137,187 describes a variable speed system with a torque and pitch controller using field oriented control, U.S. Pat. No. 5,949,672 describes a three-phase matrix converter and method for operation thereof, U.S. Pat. No. 5,943,223 describes electric switches for reducing on-state power loss, U.S. Pat. No. 5,909,367 describes a modular AC-AC variable voltage and variable frequency power converter system and control, U.S. Pat. No. 5,892,677 describes an adaptive overlapping communication control of modular AC-AC converter and integration with a device module of multiple AC-AC switches, U.S. Pat. No. 5,852,559 describes power application circuits utilizing bidirectional insulated gate bipolar transistor, U.S. Pat. No. 5,798,631 describes performance optimization controller and control method for doubly-fed machines, U.S. Pat. No. 5,729,118 describes variable speed induction generator-motor with controllable excitation frequency, U.S. Pat. No. 5,669,470 describes a roadway-powered electric vehicle system, U.S. Pat. No. 5,289,041 describes a power converter using a predicted torque set point, U.S. Pat. No. 5,029,064 describes a phase-controlled reversible power conversion with equal duty cycle substantially constant amplitude square wave excitation of the power transformer, U.S. Pat. No. 4,648,022 describes a matrix converter control system, U.S. Pat. No. 4,468,725 describes a direct AC converter for converting a balanced AC polyphase input to an output voltage, U.S. Pat. No. 4,439,823 describes converting multiphase power from one frequency to another using current waveforms, U.S. Pat. No. 4,352,155 describes a variable speed constant frequency power converter with two modes of operation, and U.S. Pat. No. 3,832,625 describes an electrical power generating arrangement and method using an induction generator. Each of these U.S. patents are incorporated by reference herein in its entirety.

SUMMARY OF THE INVENTION

The present invention describes a variable speed wind turbine with a turbine rotor including at least one blade mounted to a rotatable turbine shaft. It includes a doubly-fed induction generator having a stator and a rotor coupled to the turbine shaft for rotation and a matrix converter with an array of switching elements. The matrix converter has a control unit to control the switching elements. Additionally the turbine may include, a voltage gradient limiting circuit located between the matrix converter and the generator rotor. Additionally the turbine may include, a transformer having at least three windings including a tertiary winding and means for adjusting voltage at the tertiary winding, wherein a ratio of the input potential to the output potential is greater than 0.866. Additionally the turbine may include, a generator having a winding ratio and means for adjusting the winding ratio of the generator wherein a reduced matrix converter gain is overcome, where a ratio of the input potential to the output potential is greater than 0.866 and where a current rating of the switching elements is increased. Additionally the turbine may include, a protection circuit for protecting the matrix converter against over voltages. Additionally the turbine may include, a protection circuit for protecting the matrix converter against over voltages and for retaining control after a grid disruption. Additionally the turbine may include, means for position sensorless detection of the position of said turbine rotor with the measurement of the current of said rotor, further including the circulation of reactive power. Additionally the turbine may include a power controller for circulating reactive energy. Additionally the turbine may include, a power controller for controlling the power factor of the turbine without impacting the circulation of reactive power. Additionally the switching elements may include a standard H-Bridge module. Additionally the stator may include a stator winding means for shifting between a Y-connection and a Δ-connection. Additionally the switching elements may be thermally rated to withstand a current at least $\sqrt{2}/\sqrt{3}*707$ A. Additionally the turbine may include a means for the facilitating the active damping of current harmonics. Additionally the turbine may include a means for facilitating the active damping of resultant drive-train oscillations.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an implementation of the invention and together with the description, serve to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts. The present invention is not limited to these particular implementations but may be realized by other implementations.

Overview

The present invention can provide an efficient source of electric power that is not harmful to the environment and does not utilize non-renewable natural resources. The present invention converts the kinetic energy of the wind into electric energy. A matrix converter is used to convert a variable frequency output of a generator into fixed-frequency output power. In one implementation, the matrix converter converts only a portion of the power produced by the generator. In another implementation, the matrix converter converts all of the power produced by the generator.

Systems and methods employing a matrix converter enable turbine operation at variable speed. They increase the energy efficiency of the blades, i.e., higher energy production; reduce noise from the blades at low wind speeds; provide dynamic and full control over the active power, both below and above synchronous speed; provide dynamic and full control over the reactive power, i.e., unitary cosϕ can be obtained at the grid so as to avoid the need for large capacitor batteries; improve power quality since they can provide precise and accurate grid connection and disconnection, i.e., no inrush current during cut in or cut out; reduce the level of harmonics due to relatively high switching frequency in the converter; to some extent make it possible to include active control for the purpose of further reducing the level of lower harmonics, such as the $5^{th}$, $7^{th}$, and/or the slip harmonic component in the current; reduce power fluctuations (such as voltage variations and flicker); and reduce mechanical loading since operation at variable speeds makes it possible to control the wind turbine so that only a limited amount of stress from wind fluctuations is transferred through the drive-train components (the inertia in the drive train is utilized to absorb most of the power fluctuations). The system is also able to actively reduce the amplitude of lower frequency oscillations in the drive-train, which reduces the load in the gearbox and increases the lifetime of the drive-train components. This is done by inducing torque control signals with the same frequency as the measured speed oscillations and with an appropriate phase angle.

Figure 1:
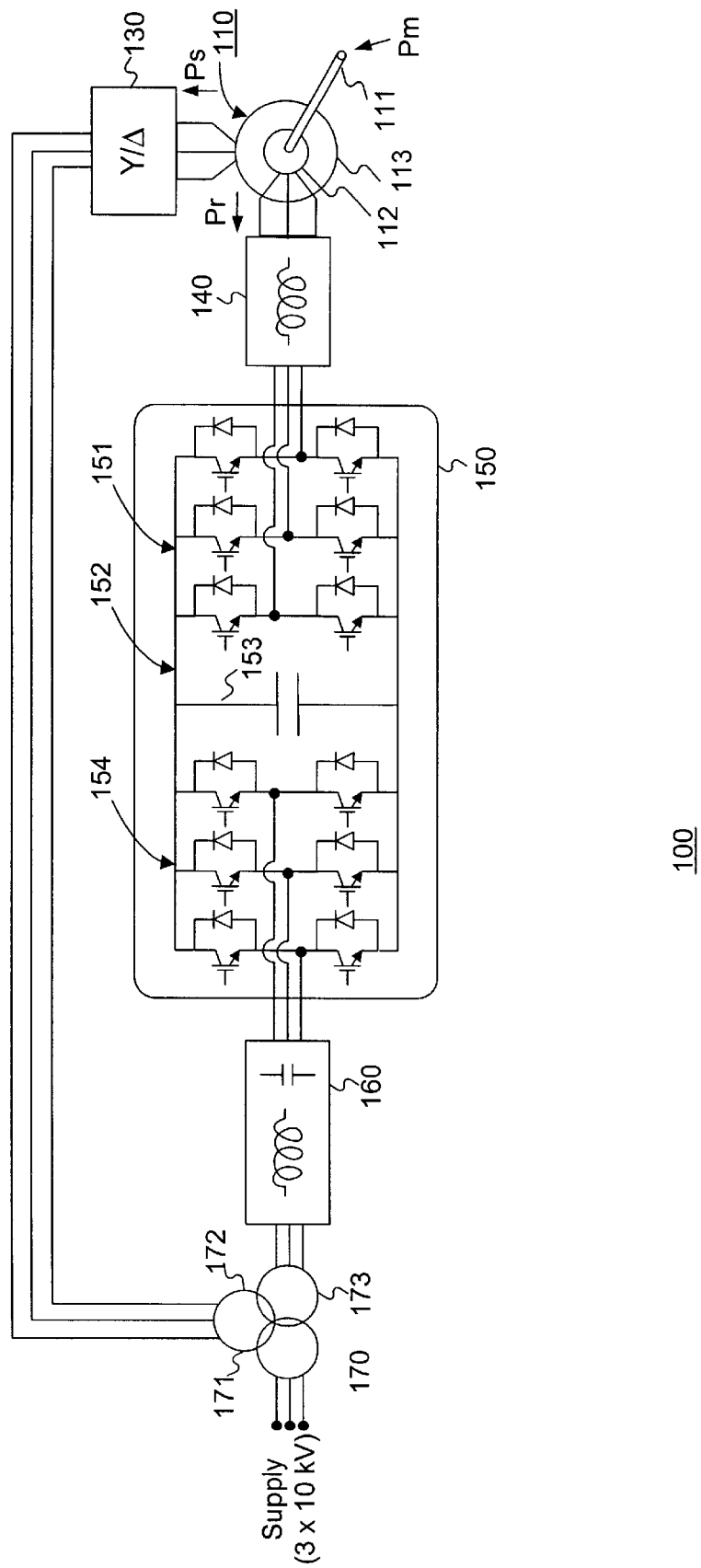
FIG. 1 illustrates a wind turbine having an indirect, back-to-back power converter.
Figure 1B:
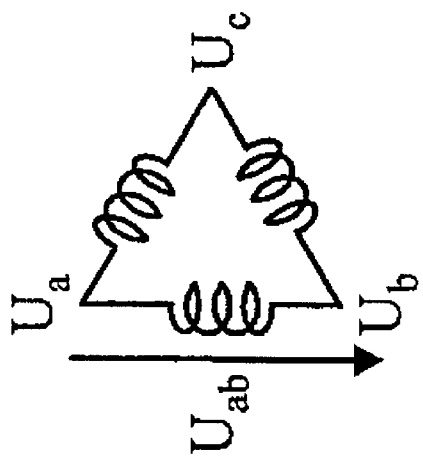
FIGS. 1A and 1B illustrate a Y-connection and a Δ-connection, respectively.
Figure 1A:
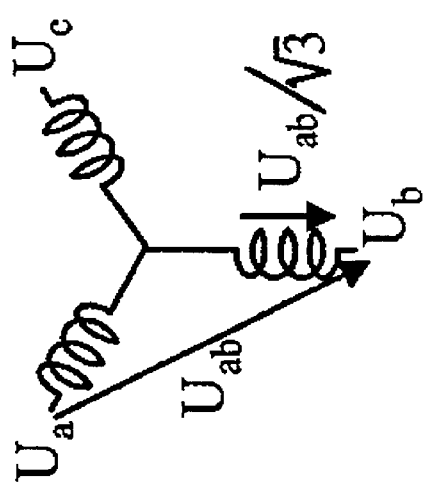
Figure 1C:
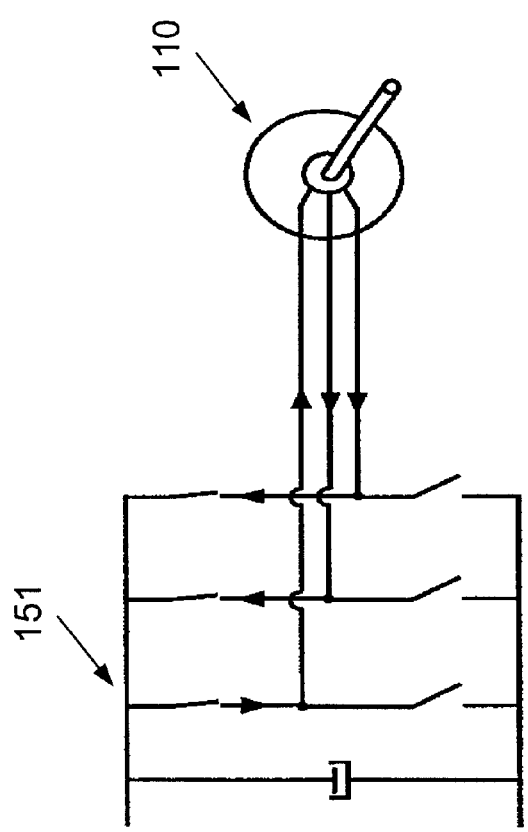
FIG. 1C illustrates the operation of rotor converter 151 of FIG. 1 at synchronous speed.

As compared to the back-to-back indirect voltage source conversion of FIG. 1, systems and methods consistent with the present invention have a number of advantages. Smaller components can be used since the thermal stress on semiconductor switches will be equal, as opposed to the unequal thermal stress discussed above for other systems. For instance, in the present voltage control system, the switch currents at rated slip (12%) is: $Isw=Ir/\sqrt{2}$ where Isw is the root means squared current through one switch and Ir is the RMS rotor current. At synchronous speed or in the near vicinity of synchronous speed, the RMS current through one switch can be as high as: $Isw=Ir*\sqrt{2}$. That is, the current ratings for the switches at synchronous speed is twice the switch currents ratings at rated speed. In the matrix converter system, the switch currents at rated slip (12%) is: $Isw=Ir/\sqrt{3}$. At synchronous speed or in the near vicinity of synchronous speed, the RMS current through one switch can be as high as: $Isw=Ir*\sqrt{2}/\sqrt{3}$. That is for the matrix converter, the current ratings for the switches at synchronous speed is $\sqrt{2}$ times the switch currents at rated speed.

Systems without a large DC link capacitance also may have a longer life. Systems and methods consistent with the present invention also may have a higher power density due to the smaller semiconductor switches and absence of any large DC link capacitance. In addition, the present invention can be highly efficient by exhibiting lower switching losses, a simpler control structure, and less demanding controller hardware.

Typically, passive filters with relatively large components are provided in turbines to reduce the level of unwanted harmonics that have been generated together with electricity at the desired frequency. In the present invention, these passive filters can be designed with smaller components because the matrix converter has a lower content of high harmonics compared to back-to-back converter 150 of FIG. 1.

Although a matrix converter has a limited voltage transfer ratio, this characteristic is not a problem when the converter is implemented in a doubly-fed turbine. In such a turbine, the generator voltage, for example, is selected with the limited transfer ratio as a design criterion. In other fields, such as motor control, the motor voltage would not be selectable as a design criterion. Also, the voltage at the grid side of the matrix converter may be raised by increasing the number of turns on the tertiary winding of the transformer or a separate transformer.

In an implementation of the present invention, power control is achieved without the need for an input from an electromechanical sensor at the main generator shaft that detects the position of the shaft. Eliminating a position sensor makes the system mechanically more robust.

Figure 7:
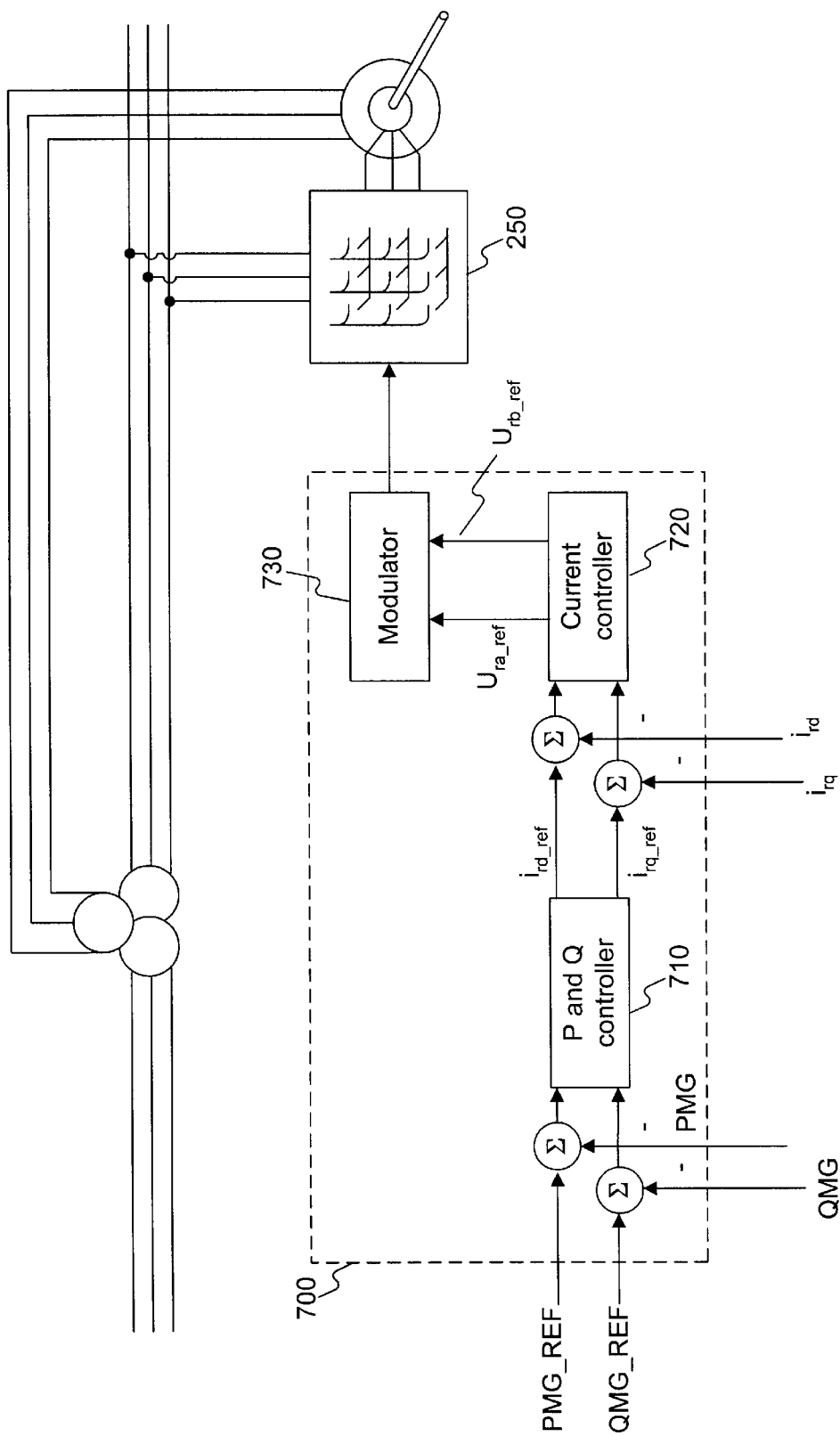
FIG. 7 illustrates a high level diagram of a control system for the wind turbine of FIG. 2.

At light load, where rotor currents have low amplitude, an accurate position sensorless rotor angle detection might be difficult to obtain because the ripple due to switchings is very pronounced compared to the fundamental rotor current. To increase the accuracy of the rotor angle observation, the present invention uses the fact that circulation of reactive power (e.g. a reactive power is forced to circulate from the matrix converter through the rotor to the stator and back to the matrix converter) can be used to increase the rotor current amplitude without changing the overall power factor of the system. That is the power factor seen from the grid point of connection is maintained at unity (or any desired value). To improve the performance of the sensorless rotor position scheme, the reference QMG_REF, in FIG. 7 is increased, thereby increasing the rotor current. The increase in the reactive rotor current causes an increase in the reactive part of the stator current making the stator current leading the stator voltage, such that the power factor at the stator side becomes leading (capacitive). To compensate this leading power factor in order to achieve unity power factor at the grid connection, the reference power factor for the input side of the matrix converter is set to consume reactive power, i.e. a lagging power factor.

Compared to the present VCS-system, the matrix converter has a limited ability for circulating reactive power due to the fact that the voltage gain of the matrix converter decreases as the power factor of the matrix converter decreases ($V_r=V_g*0.866*\cos(\phi_i)$) where $\phi_i$ is the angle between current and voltage at the input of the matrix converter.

Figure 13:
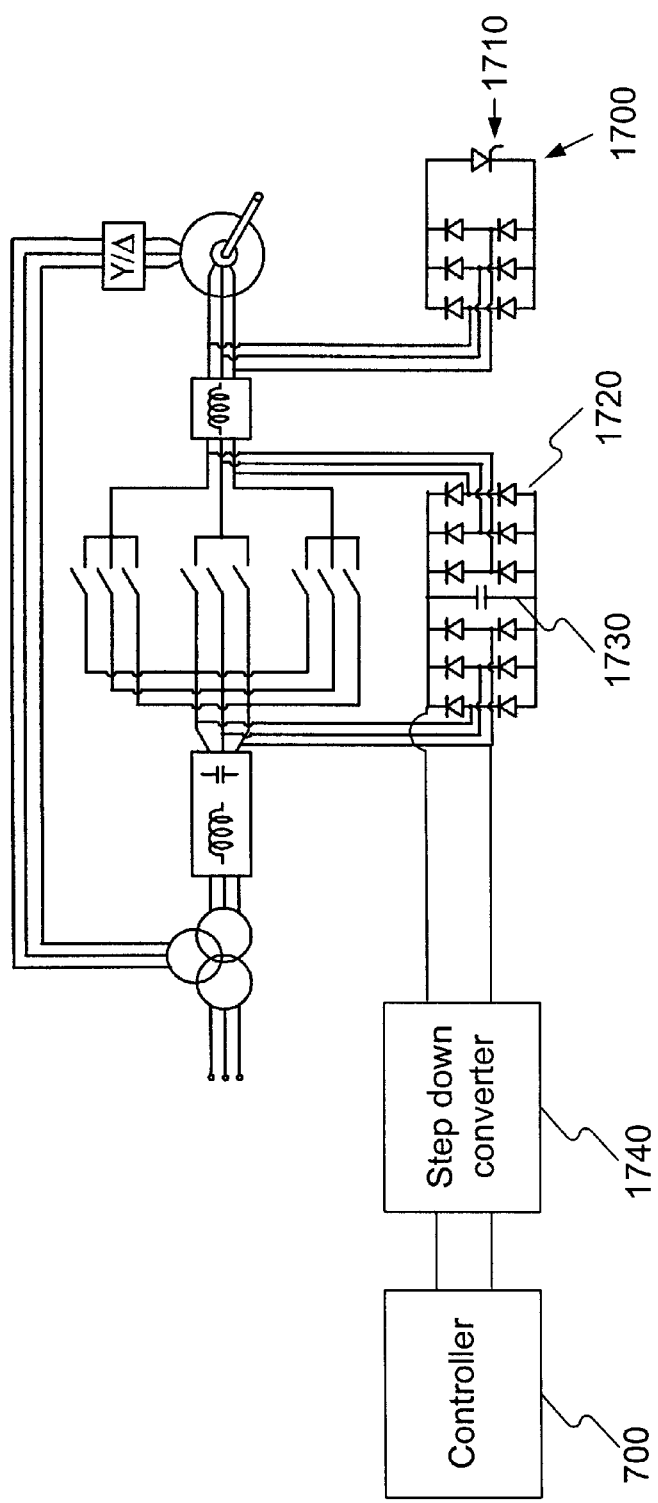
FIG. 13 illustrates the protection circuitry for a wind turbine consistent with the present invention.

The protection circuit in practical matrix converter applications have useful, dual functions in wind turbine applications. For example, a matrix converter can include a clamp circuit for protection of the converter switches against over voltages caused from the inherent presence of stray inductances between the input filter and the matrix switching element array. This clamp circuit also can be used to supply power for the matrix converter controller circuitry, as shown in FIG. 13, also during a period of power grid disturbance, where energy to the control circuits is supported by energy stored in the generator. As a result, the matrix converter will be able to resume control of the generator when the grid disturbance disappears. This back-up of the controller for the matrix converter enables the generator to be operated immediately after a disturbance has ended. Further, to prevent damages on the matrix converter switches caused from abnormal grid conditions for instance when a grid disruption disappears, an over voltage protection circuit in the form of a clamp circuit is inserted on the three rotor terminal of the generator.

In high-power implementations, the matrix converter preferably uses a power control procedure to permit control of both the real and reactive portions of power that is output from the wind turbine. The use of a matrix converter in a high-power wind turbine is contrary to the conventional wisdom in the field. In fact, matrix converters have been criticized because the output voltage (generator side in the present case) is limited to a percentage, 0.866, of the input voltage (grid side). Nevertheless, in the present system, this limitation on the voltage that is output from a matrix converter can be overcome by adjusting the voltage on the transformer or the generator.

The wind turbine of the present invention is more efficient due to lower switching losses. Lower switching losses are obtained because half of the switchings become natural switchings. Half of the switching can be natural communications, such as soft switching. A simpler control structure due to single-stage power conversion, lowers the level of undesirable harmonics by using more voltage levels, and increases the lifetime of the power conversion unit by providing equal thermal stress on the semiconductors in the conversion unit independent of the rotor frequency. The output harmonic content of a matrix converter can be made lower than the harmonic content of the wind turbine shown in FIG. 1 because the matrix converter outputs voltages at three different levels instead of two (like back-to-back converter 150 of FIG. 1). Indeed, since the harmonic content of the voltage output is reduced, filters designed to remove harmonics can be made smaller. Further, since there is no DC-link capacitor, the maintenance requirements of the wind turbine can be reduced and the lifetime is increased.

To prevent damages on the rotor windings insulation caused from flash over voltages and to increase the lifetime of the rotor windings, a voltage gradient limiting circuit is inserted between the matrix converter and the rotor of the generator. The voltage gradient circuit comprises, for example, a three phase inductance or a three phrase inductance-capacitor filter. By inserting the voltage gradient limiting circuit, the gradients of the applied voltages is shared between the rotor winding and the voltage gradient limiting circuit.

B. Architecture

1. Overall Configurations

Figure 2:
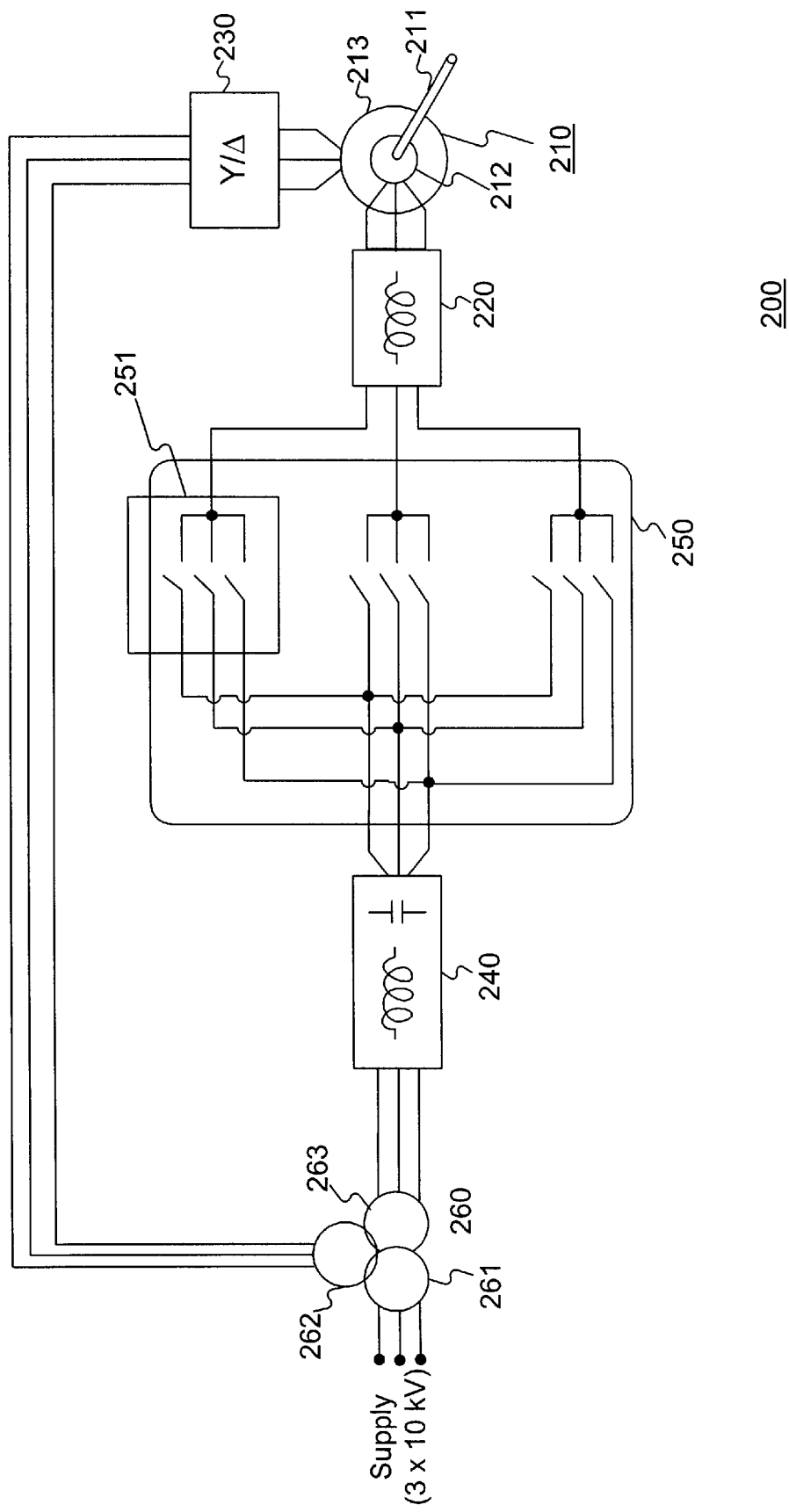
FIG. 2 illustrates a first configuration of a wind turbine having a matrix converter consistent with the present invention.

A variable speed wind turbine 200 consistent with the present invention is shown in FIG. 2. One or more wind turbine blades (not shown) drives an doubly-fed induction generator 210 via rotor shaft 211. Turbine 200 supplies power from rotor 212 and stator 213 of generator 210 when generator shaft 211 is rotating at a speed higher than synchronous speed. At these shaft speeds above synchronous speed, excitation power may be supplied to the rotor of the generator. At shaft speeds lower than synchronous speed, power is supplied from stator 213 while the slip power and the excitation power is supplied to rotor 212 from converter 250.

By use of a Y/Δ-connector, the stator 213 winding can be selectively shifted into a Y-connection or a Δ-connection. The output of stator 213 is fed into a transformer 260, having a secondary voltage of 690 V, for example. The switch 230, however, is only exemplary and the stator can be directly connected to transformer 260 in a fixed Y- or Δ-connection. The transformer steps up the voltage to an amount, for example 10 kV, required for a power supply, such as a utility. Alternatively, the output from stator 213 can be connected directly to the utility grid or to a separate transformer, instead of transformer 260.

To supply power to/from rotor 212, current induced in rotor 212 is passed through a voltage gradient limiting circuit 220 to a power converter 250. Circuit 220 acts to prevent large voltage changes across the generator windings and thereby increases the lifetime of the winding insulation.

Power converter 250 directly converts the fixed frequency, fixed amplitude AC-voltage at the grid side of the converter to a variable frequency, variable amplitude AC voltage at the rotor side of the converter. As a result, power converter 250 does not include, among other components, the DC link 152 or capacitance 153 that must be provided in power converter 150 of FIG. 1.

To directly convert a fixed frequency, fixed amplitude AC-voltage to a variable frequency, variable amplitude AC voltage, power converter 250 includes a matrix converter. A matrix converter is an array of switching elements. By controlling the switches in the array with signals from a control unit (not shown in FIG. 2), the matrix converter converts a fixed frequency, fixed amplitude AC-voltage at the grid side to a variable frequency, variable amplitude AC voltage at the generator side. By a proper connection of the grid phases $u_a$, $u_b$ and $u_c$ to the generator phases $u_x$, $u_y$ and $u_z$, both the grid currents and generator voltage can be controlled. The relationship between generator voltage $v_x$, $v_y$ and $v_z$ and the grid voltages $v_a$, $v_b$ and $V_c$ of the matrix converter is calculated by:

$$\begin{bmatrix} v_x \\ v_y \\ v_z \end{bmatrix} = \begin{bmatrix} T_{11} T_{12} T_{13} \\ T_{21} T_{22} T_{23} \\ T_{31} T_{32} T_{33} \end{bmatrix} \begin{bmatrix} v_a \\ v_b \\ v_c \end{bmatrix} \quad (6)$$

Figure 2A:
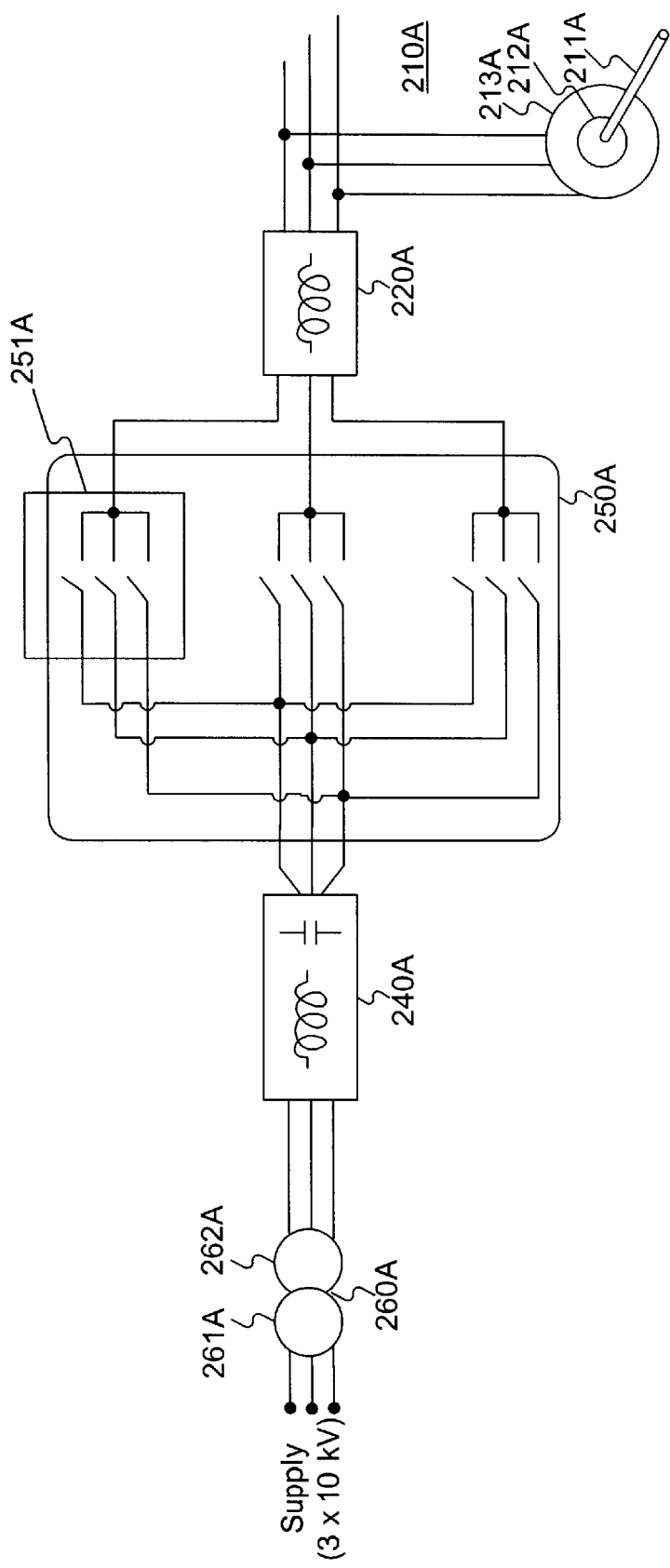
FIG. 2A illustrates a second configuration of a wind turbine having a matrix converter consistent with the present invention.

The transfer matrix T represents the transfer function from the instantaneous input voltage to the instantaneous output voltage. Since no internal storage exists in the matrix converter, the grid currents are given as:

$$\begin{bmatrix} i_a \\ i_b \\ i_c \end{bmatrix} = \begin{bmatrix} T_{11} T_{21} T_{31} \\ T_{12} T_{22} T_{32} \\ T_{13} T_{23} T_{33} \end{bmatrix} \begin{bmatrix} i_x \\ i_y \\ i_z \end{bmatrix} \quad (7)$$

where $i_a$, $i_b$ and $i_c$ are the grid currents and $i_x$, $i_y$ and $i_z$ are the generator currents, which in the implementation of FIG. 2 are rotor currents (in the implementation of FIG. 2A, the generator currents are stator currents). The elements of the transfer function have to be assigned values that assure output voltages and input currents follow their respective references. By defining a modulation strategy, the elements in T can be calculated at any instant of time. For sinusoidal input currents and output voltages, the matrix converter has an intrinsic output voltage limit of $$v_{generator} = \frac{\sqrt{3}}{2} v_{grid}.$$

Consequently, the generator voltage and the grid currents are controllable parameters. On the other hand, the grid side voltage of the matrix converter is determined by the grid, while the generator currents are determined by the characteristics of the generator.

A filter 240 smoothes the switched AC-current from power converter 250, and passes the smoothed current to a tertiary winding of transformer 260. Transformer 260 steps up the voltage to an amount, for example 10 kV, required for a power supply, such as a utility. Of course, the output of filter 240 could be directly coupled to the grid without any transformer or a separate transformer could be used.

Another embodiment of a wind turbine 200A consistent with the present invention is shown in FIG. 2A. Wind turbine 200A differs from wind turbine 200 in that wind turbine 200A uses an induction generator 210A that does not have brushes (electrical connections), to rotor 212A. For example, induction generator 210A could be a squirrel-cage induction generator.

Since generator 210A does not have brushes, all of the power produced by generator 210A is output from the stator 213A. The three-phase output, for example, of stator 213A is connected to a voltage gradient limiting circuit 220A, which prevents large voltage changes across the generator windings. The output of this circuit is connected to a power converter 250A, which is similar to power converter 250 of FIG. 2 and includes a matrix converter for converting the constant frequency, constant amplitude voltage from the grid supply to a variable frequency, variable amplitude voltage at the stator side of generator 210A. Nevertheless, since the matrix converter of power converter 250A must handle all of the power of the generator, the components constituting the matrix converter must withstand higher voltages and/or currents.

A filter 240A smoothes the constant-frequency AC current from power converter 250A, and passes the smoothed current to a secondary winding of transformer 260A. Transformer 260A steps up the voltage to an amount, for example 10 kV, required for a power supply, such as a utility. Transformer 260A does not require a tertiary winding. Of course, the output of filter 240A could be directly coupled to the grid without any transformer.

In the doubly-fed variable-speed wind turbine system of FIG. 2, converter 250 is fed from transformer 260. Transformer 260 has a primary winding connected to the supply (utility grid) and secondary and tertiary windings. Converter 250 is connected to the tertiary winding of transformer 260, as mentioned above. The intrinsic property of matrix converters that limits the output voltage to be 0.866 of the input voltage does not constitute a problem in the present invention because a fairly arbitrary voltage can be chosen for the tertiary winding of transformer 260. In contrast, this property can be a problem in systems in which a matrix converter is used to drive a variable speed standard motor.

The voltage that is chosen for the tertiary windings of the transformer 260 is calculated in accordance with the desired speed range. For example, to achieve a dynamic speed range of ±30% around synchronous speed (i.e., maximum slip equals ±30%), the converter should be able to deliver an output voltage $V_r$ at the rotor terminals which satisfies the following equation:

$$V_r = s \cdot V_{r0} \quad (8)$$

where s is the slip and $V_{r0}$ is the standstill voltage at the rotor terminals when the stator is connected to the supply grid.

For example, when the standstill line-line voltage $V_{r0}$ is 1820 V, the rotor converter must be able to deliver a voltage of 546 V (1820 V×0.3) to achieve a speed range of ±30%. To achieve this voltage, the line-line voltage at the grid side of the matrix converter $V_{t3}$ has to be 630 V (546 V/0.866). On the other hand, the voltage at the tertiary winding should not be higher than necessary because that would require an increase in the voltage ratings of the switches in the converter. Ideally, the peak voltage across the switch $\hat{v}_{sw}$ is:

$$\hat{v}_{sw} = V_{t3} \cdot \sqrt{2} \qquad (9)$$

For a tertiary winding voltage of 630 V, the switch voltage ratings are 892 V. When safety factors are included, the switch voltage ratings should be at least 1200V.

In the full scale converter of FIG. 2A, the switches and the transformer have to be designed in accordance with the nominal stator voltage. No tertiary winding is present in transformer 260A. If the nominal voltage of the generator (stator) is $V_{sg}$, the necessary nominal voltage at the secondary transformer winding is calculated to be $V_{sg}/0.866$. For example, if the nominal generator line-line voltage is 690 V, the necessary transformer line-line voltage becomes 796 V. Ideally, the switches in the matrix converter would have to withstand 1126V (796 V×1.414). When safety factors are incorporated to compensate for over voltage conditions at the grid and intrinsic transient voltages in the converter, the switches should be rated higher than 1200 V, i.e. 1400–1700V. The intrinsic voltage gain of the matrix converter also might be overcome by adjusting the generator winding ratio in order to lower $V_{r0}$.

2. Matrix Converter Architectures

Matrix converters 250 and 250A convert a fixed-frequency AC voltage into a variable-frequency AC voltage. Various architectures are available for a matrix converter used in a wind turbine consistent with the present invention. For example, in addition to the three-phase to three-phase matrix converters shown in FIGS. 2 and 2A, the matrix converter can include any number of input phases or output phases, dependent on the system design. Further, the bidirectional switches in the matrix converter can be of any design that allows for force-commutated control.

FIGS. 3A–3E are examples of some of the different switching arrangements that can be used in a turbine consistent with the present invention.

Figure 3E:
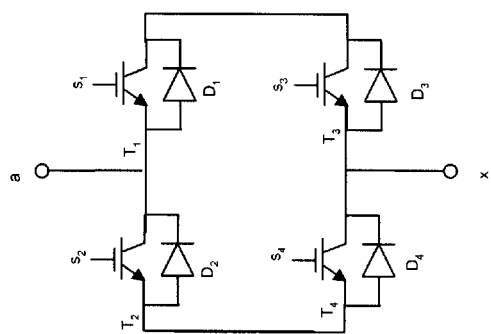
FIGS. 3A–3E illustrate bidirectional switches for use in matrix converters.
Figure 3D:
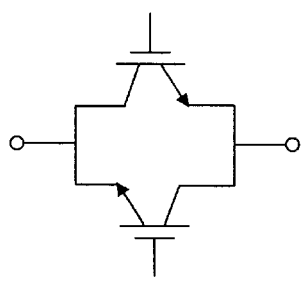
Figure 3C:
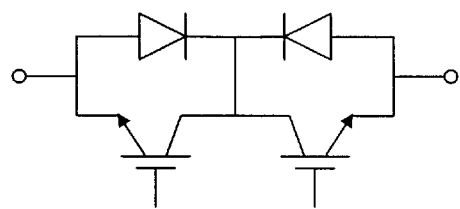
Figure 3B:
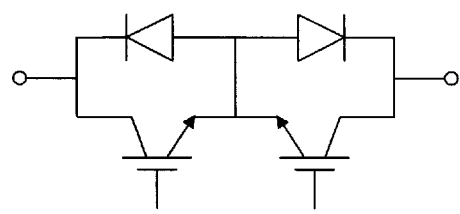
Figure 3A:
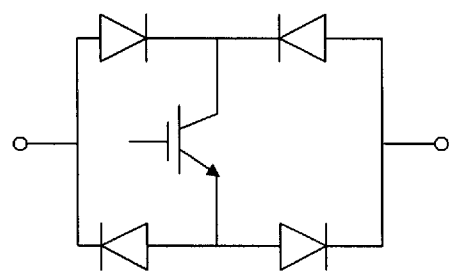

FIG. 3A illustrates a diode-embedded bidirectional switch. The diode-embedded bidirectional switch acts as a true bidirectional switch. Nevertheless, the diode-embedded bidirectional switch is not preferred since it does not permit control of the current direction and also because the current conducting path involves three semiconductors per phase. The switches shown in FIGS. 3B–3E can control the current direction, which is preferable in the phase commutations for the matrix converter. Also, a true bidirectional switch such as that described in U.S. Pat. No. 5,977,569 (incorporated herein by reference) can be used.

FIG. 3B illustrates a common emitter bidirectional switch and FIG. 3C illustrates a common collector bidirectional switch. Presently, these are the bidirectional switches that are most commonly used in matrix converter applications. A major advantage of these switches is that they can control the current direction while the diodes ensure safe commutation between current reversals. Nevertheless, a drawback of the switches in FIGS. 3B and 3C is that they each use two semiconductors per phase in the current path.

FIG. 3D illustrates a reverse blocking NPT-IGBT (Non-Punch-Through-Insulated Gate-Bipolar-Transistor) bidirectional switch. The switch of FIG. 3D has only one semiconductor per phase in the current conducting path. As a result, the conduction line losses using this type of switch can be lower than the losses that occur with the switches shown in FIGS. 3A–3C. Due to the lack of diodes, however, the switch of FIG. 3D does not have natural commutation properties. Consequently, there are difficulties in current reversals. The switch in FIG. 3D must be built from two NPT-IGBT's without anti parallel diodes so that the grid supply is not constantly short circuited. The switch in FIG. 3E is realized from a standard H-bridge module and becomes a parallel connection of a common emitter and a common collector configuration. For high power levels where the currents are so high that paralleling of bidirectional switches have to be used the configuration in FIG. 3E might be the best solution. Using the H-bridge module, the current direction is controllable, exactly as for the witch configuration in FIGS. 3B–D and further, the anti parallel diodes ensure safe communications during current reversals. Referring to FIG. 3E, to allow a current from phase a to phase x, gate signals (high) should be impressed at gate $S_2$ and gate $S_3$ allowing a current path through $T_2$, $D_4$ and through $D_1 T_3$. Similar, to allow a current flow from terminal x to terminal a, gate signals should be impressed at gate $S_2$ and gate $S_4$, allowing a current path through $D_3 T_1$ and through $T_4 D_2$.

Given the engineering trade-offs identified above for a switch, a switch realized from the standard H-bridge module in FIG. 3E is preferred in the present invention because the H-bridge module is an existing technology and by using existing technology, the present invention is not tied to a particular manufacturer of a special module, thereby reducing the cost of the wind turbine component. For example, SEMIKRON manufactures intelligent H-bridge modules incorporating both protection, deadtime generation and insulated gate drivers.

Figure 4:
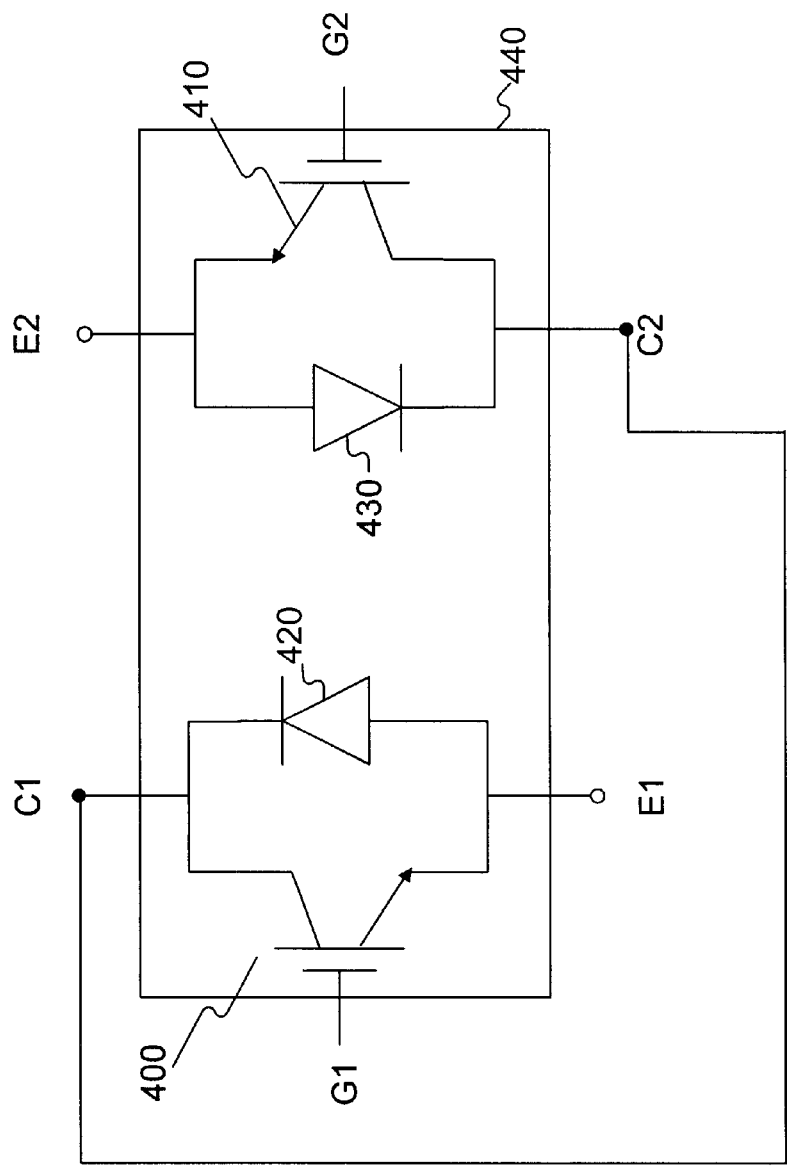
FIG. 4 illustrates a configuration of a bidirectional switch using a first standard switch module.

FIG. 4 illustrates another way to reconfigure existing technology to produce a common collector bidirectional switch. FIG. 4 illustrates a pair of transistors 400 and 410 having diodes 420 and 430 connected in parallel between their emitters and collectors. Transistors 400 and 410 and diodes 420 and 430 are typically encased in a package 440 referred to as a module. Module 440 provides external connections to the gate G1, emitter E1, and collector C1 of transistor 400 as well as the gate G2, emitter E2, and collector C2 of transistor 410. Connecting the external connections C1 and C2 together produces the common collector switch of FIG. 3C, while connecting E1 and E2 produces a common emitter switch. A switching array of a matrix converter 250 includes nine modules 440. EUPEC manufactures modules FF400R12KL4 and FF800R12KL4C, which can be used to produce the bidirectional switch of FIG. 4 (depending on the rated output power of the wind turbine). Table 1 illustrates characteristics of transistors that can be used in high-power wind turbine applications consistent with the present invention.

TABLE 1

| 850 kW | 2 MW |
| --- | --- |
| FF400R12KL4 | FF800R12 KL4C |
| $V_{CES}$ = 1200 V | $V_{CES}$ = 1200 V |
| $I_C$ = 400 A | $I_C$ = 800 A |
| $I_{CRM}$ = 800 A | $I_{CRM}$ = 1600 A |
| 140 × 130 mm | 140 × 130 mm |

Figure 6:
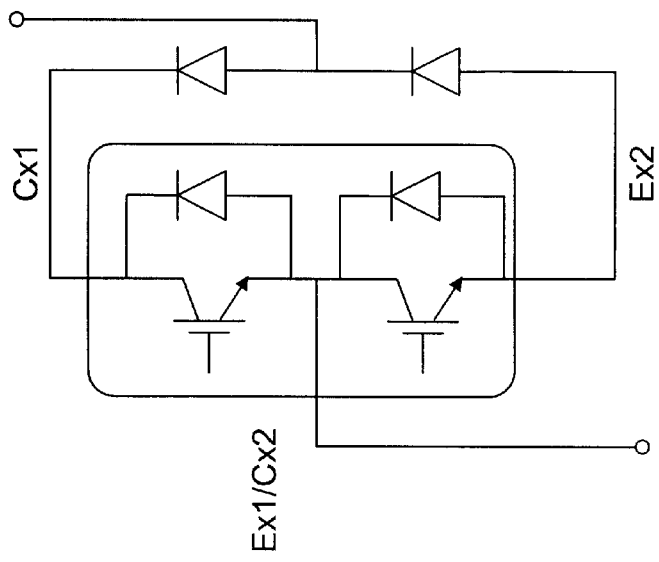
FIG. 6 illustrates a configuration of a bidirectional switch using the standard module of FIG. 5
Figure 5:
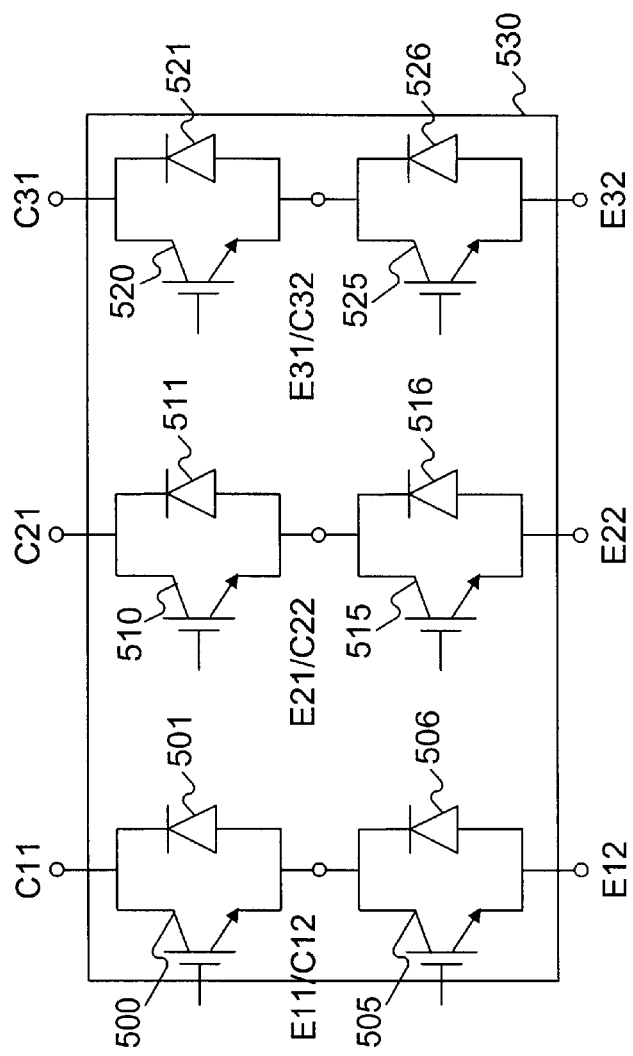
FIG. 5 illustrates second standard switch module.

FIGS. 5 and 6 illustrate another way to produce a bidirectional switch using existing technology. Three six-pack modules along with 9 dual pack additional diodes can be used to produce the nine bidirectional switches for a three phase to three phase matrix converter. FIG. 5 shows a six-pack module having six transistors 500, 505, 510, 515, 520, and 525, each having an associated diode 501, 506, 511, 516, 521, or 526, respectively, connected in parallel between the emitter and collector of the corresponding transistor. The emitter E11 and collector C12 of transistors 500 and 505 are connected together inside module 530, as are emitter E21 and collector C22 of transistors 510 and 515 and emitter E31 and collector E32 of transistors 520 and 525.

FIG. 6 shows a realization of one bidirectional switch for one of the portions in FIG. 5. By connecting a pair of diodes in parallel between the collector on one side of the module to the emitter on the other side of the module for a pair of transistors in the six pack. The input of the switch is the common emitter/collector connection of the six pack and the output of the switch is the node between the two external diodes. This bidirectional switch is neither a common collector switch nor a common emitter switch. Therefore, it requires a high number of insulated gate drives (for example, twelve for a three phase to three phase matrix converter). The common collector bidirectional switch of FIG. 4 is preferable to the FIG. 6 switch because it reduces the number of insulated gate drives to six and avoids the additional diodes.

C. Architectural Operation

Figure 8:
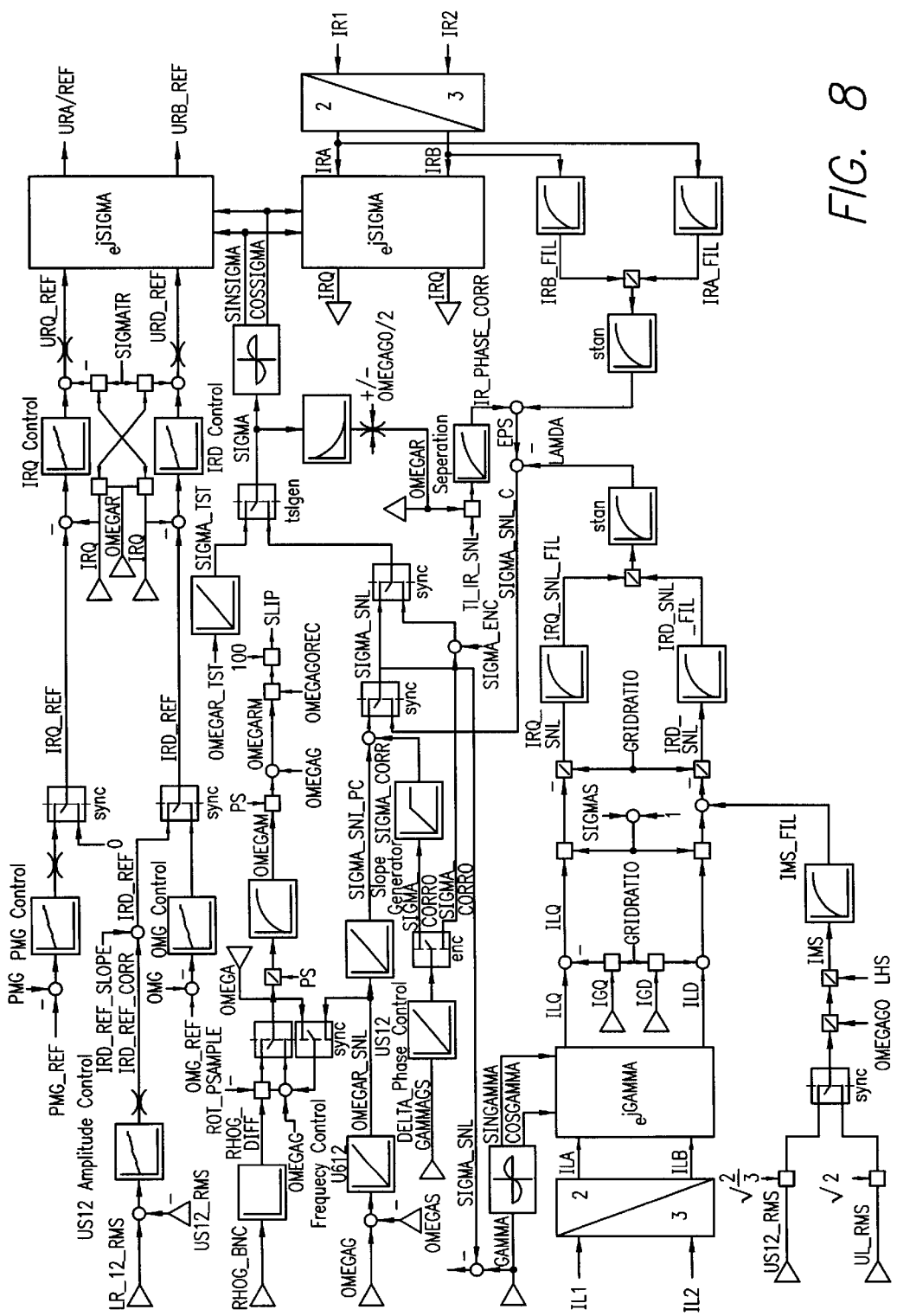
FIG. 8 is a detailed schematic diagram of controller operations for a matrix converter.
Figure 9:
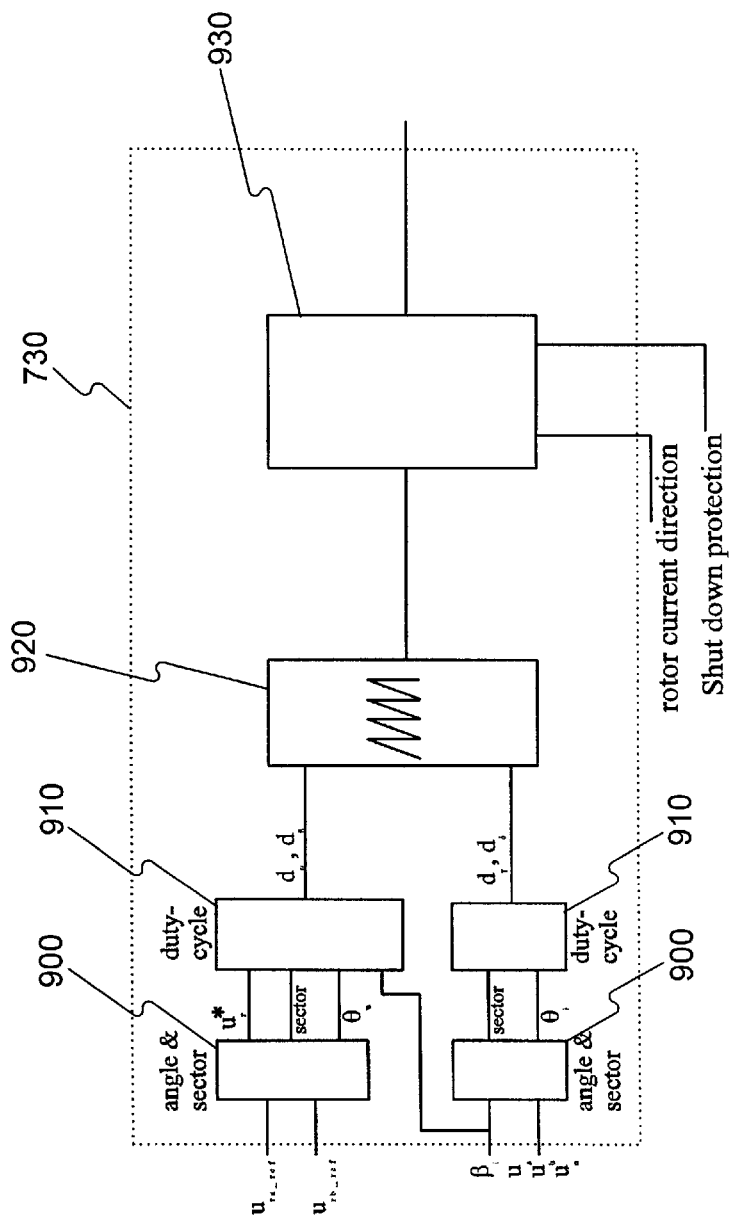
FIG. 9 illustrates a configuration of a modulator for controlling a matrix converter.
Figure 10:
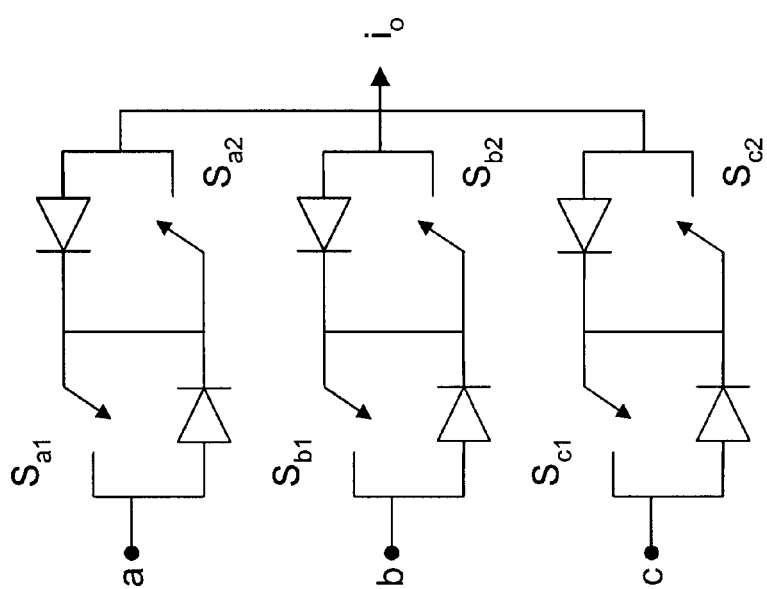
FIG. 10 is a schematic diagram of one output leg of the matrix converter.
Figure 11:
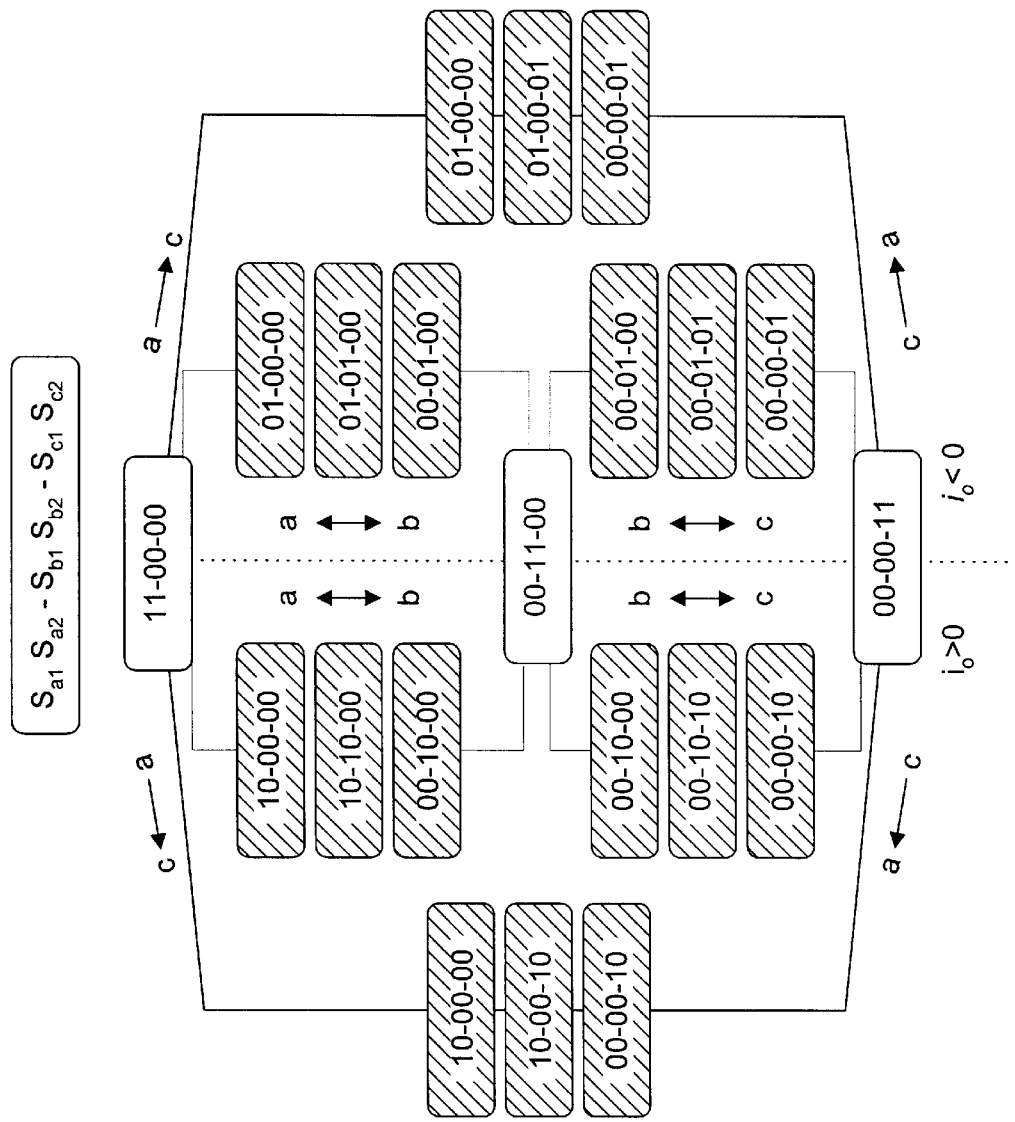
FIG. 11 illustrates a four-step commutation algorithm for changing the output voltage of a phase leg from one input phase to another input phase.

FIGS. 7–9 illustrate operation of a control system for a wind turbine consistent with the present invention. While FIGS. 7–9 focus on control of wind turbine 200 shown in FIG. 2, the control of wind turbine 200A shown in FIG. 2A can be derived from the following description. FIG. 7 illustrates a high-level view of a control system for the wind turbine consistent with the embodiment of FIG. 2. FIG. 9 illustrates the functionality of modulator 730 of FIG. 7. Modulator 730 of FIG. 7 includes commutation logic as shown in FIG. 9 at 930. FIGS. 10 and 11 provide an example of the functionality of the commutation logic.

As shown in FIG. 7, a control system 700 outputs signals to control matrix converter 250. The control system can include a Digital Signal Processing Unit (DSP), for example, the TMS3200C32 made by Texas Instruments. To increase processing power, additional DSPs can be included and may operate independently or in a master/slave manner. Control system 700 can also include components such as memory, input devices, output devices, a display, other user interfaces, and network connections to other computer systems.

Control system 700 is a power control system that controls the overall power of the wind turbine. Control system 700 does not directly control other parameters, such as generator torque. Nevertheless, to provide increased protection for the generator and wind turbine elements (such as the gearbox, not shown), control system 700 can be implemented as a torque control system. Examples of torque control systems are described in U.S. Pat. Nos. 5,083,039, 5,225,712, 6,137,187 and PCT Application U.S. Ser. No. 99/07996. Additionally, the control can be implemented as direct torque control to achieve faster response time for the real power P and reactive power Q. In this regard, see Domenico Casadei et al., "The Use of Matrix Converters in Direct Torque Control of Induction Machines," 2*IEEE Industrial Electronics Society* 744–749 (1998) (incorporated by reference herein in its entirety).

The inputs to power control system 700 are desired amounts of total active power PMG_REF and reactive power QMG_REF. The desired amount of real power is based on the average power available in the wind at a given point in time. Various methods are available to estimate the amount of power available in the wind. For example, the estimate can be based on a direct measurement of wind speed or on a predicted wind speed, or on a combination of the above, as known to persons in the art. The desired amount of reactive power is not based on wind speed. Instead, the desired reactive power can be set to any level by the operator of the wind turbine. Also, the wind turbine can sense the power condition of the supply (utility grid) and determine the amount of reactive power needed to correct this condition. Power in the wind can also be predicted based on knowledge about power delivered to the grid, speed of the generator and the pitch angle of the blades, but other ways to predict power in the wind are also possible.

The real and reactive power references PMG_REF and QMG_REF shown in FIG. 7 are compared to measured values of real and reactive power PMG and QMG of the wind turbine. The results of these comparisons are fed into a P and Q controller. The P and Q controller converts the results into reference commands for the direct and quadrature components of the rotor current, $i_{rd\_ref}$ and $i_{rq\_ref}$. Then, the reference signals for the direct and quadrature rotor currents are compared to measured values of the direct and quadrature rotor currents, $i_{rd}$ and $i_{rq}$. The results of this comparison are fed into current controller 720, which produces the desired direct and quadrature rotor reference voltages $u_{ra\_ref}$ and $u_{rb\_ref}$.

A more detailed control algorithm for determining $u_{ra\_ref}$ and $u_{rb\_ref}$ is shown in FIG. 8. One particular feature of the control algorithm shown in FIG. 8 is that it permits a sensorless determination of rotor position. It is important in a control system of a generator to detect the slip angle, i.e., the angle between the stator voltage vector and the rotor position. This is a relatively easy task using a grid angle, which is determined below, and a physical rotor position encoder. Nevertheless, such an encoder can decrease the reliability of the wind turbine. Further, maintenance of the encoder is required to ensure its accuracy. FIG. 8 selectively permits a rotor position sensorless mode of operation, in which the rotor position is determined from measured rotor currents. The elements between the inputs OMEGAG and OMEGAS and output SLIP on FIG. 8 are portions of the rotor position sensorless path, whereas the elements between the input RHOG_ENC and output SLIP are portions of a path employing a rotor position encoder.

FIG. 9 shows a modulator 730 implemented as a dedicated control circuit. Alternatively, modulator 730 could be integrated with controller 720 and its processor. The function of modulator 730 is to turn on and off the appropriate switches inside the matrix converter at the appropriate times, i.e., to determine the duty cycles dα, dβ, dδ, and dγ of the switches. In FIG. 9, rotor voltage references $u_{ra\_ref}$ and $u_{rb\_ref}$ are input from the current controller 720 of FIG. 7 to modulator 730, along with information about the angle of the grid voltage derived from the three phase voltages of the supply grid voltages $u_a$, $u_b$ and $u_c$ (or a direct input of the grid angle). A further input, which is set by the user, is the desired angle ($\phi_i$, between the supply grid current and supply grid voltage, which is related to the desired power factor (cos $\phi_i$) of the matrix converter.

In accordance with these inputs, angle and sector calculators 900 compute commands used in duty cycle calculators 910 to determine the duty cycles for the switches of the matrix converter. Once the duty cycles dα, dβ, dδ, and dγ of the switches are calculated, PWM generator 920 computes nine gate signals for controlling the switches. Commutation logic 930 converts the nine gate signals into eighteen gate signals to control the bidirectional switches in the matrix converter. The logic 930 uses an input of the direction of the three rotor currents in order to achieve safe phase commutations, as discussed above. Phase commutations occur, for example, when rotor phase x has to be shifted from being connected to grid phase a to grid phase b. In addition, a shut down signal is input to modulator 730 to shut down the matrix converter in any failure situation (for example, over voltage, over current, or over temperature).

For the functionality of the matrix converter in the wind turbine of FIG. 2, it is desirable to input the supply voltage grid angle $\beta_i$. While L. Zhang and C. Watthanasarn, "A Matrix Converter Excited Doubly-Fed Induction Machine as Wind Power Generator," IEE Power Electronics and Variable Speed Drives 532–537 (1998) and "Application of a Matrix Converter for the Power Control of a Variable-Speed Wind-Turbine Driving a Doubly-Fed Induction Generator" (1997) (incorporated herein by reference in its entirety) describe a matrix converter for a doubly fed induction generating system, the main grid angle is merely a simulation variable. In the system illustrated herein in FIG. 2, the main grid angle is detected from measurements, even under unbalanced and distorted conditions, using a control algorithm. This algorithm is illustrated in FIG. 12.

Figure 12:
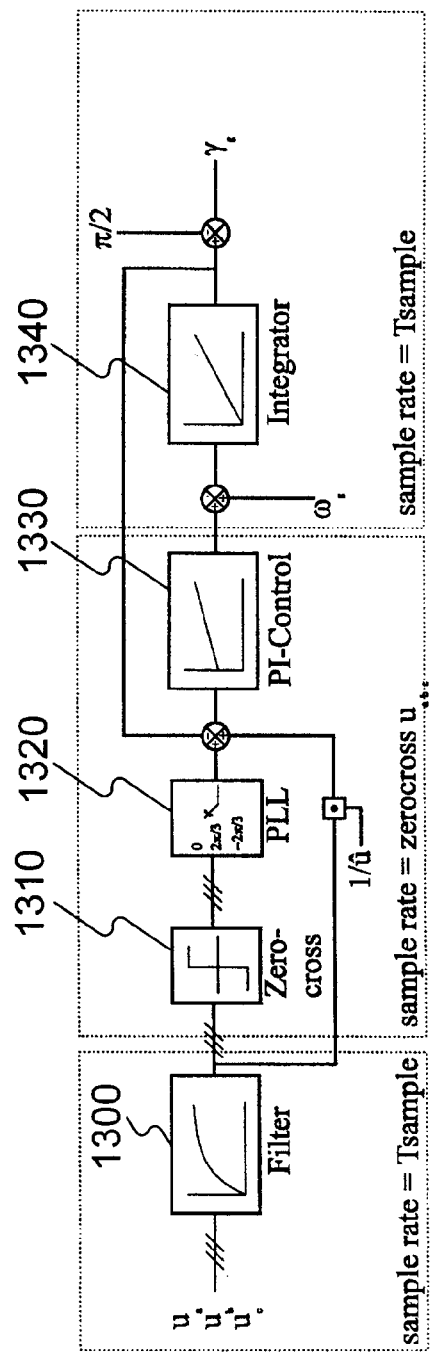
FIG. 12 illustrates a configuration to predict a grid angle for the modulator of FIG. 9.

In FIG. 12, the grid angle that is input to the modulator 730 of FIG. 9 is calculated using only the nominal main grid frequency $\omega_g$ and the periodically appearing zero-crossings of the grid voltages $u_a$, $u_b$, and $u_c$. In this regard, the grid side voltages $u_a$, $u_b$, and $u_c$ are input to the grid angle calculator 1350 of FIG. 12. The voltages are passed through a low pass filter 1300 to eliminate measurement noise and high-frequency transients appearing on the supply grid. The filtered supply grid voltages are then input to a zero crossing detector 1310. A phase-lock-loop (PLL) 1320 receives the output of zero crossing detector 1310 and, depending on which phase has crossed zero, outputs 0, $2\pi/3$ or $-2\pi/3$. To compensate for the phase displacement through filter 1300, a linear correction factor $1/\hat{u}$ is incorporated into the algorithm. The error between the actual angle (output from PLL circuit plus correction) and the estimated angle, which is a feedback signal, is input to a PI-controller 1330. The output from PI-controller 1330 is added to the nominal angular frequency of the main grid $\omega_g$ and provided to integrator 1340. Integrating on the corrected angular frequency gives a phase angle, which is fed back to PI-controller 1330.

The system described by Zhang and Watthanasarn provides only simulation results and therefore does not realize many of the problems that have to be faced when an implementation is attempted, such as the use of protection circuits, voltage gradient limiting circuits, and sensorless operation. In the system, there is no implementation of adjusting the generator winding ratio or the voltage at the input side of the matrix converter to overcome the inherent voltage gain transfer ratio of the matrix converter. There is also no consideration of the control of the total (sum of the stator and rotor power) active power and reactive power, thereby preventing the system from achieving full control of active and reactive power. Further, the system described by Zhang and Wafthanasarn can not use circulating reactive power (because only stator quantities are controlled) to increase the rotor currents and thereby improving the position sensorless control at light loads.

In sum, since control system 700 controls the matrix converter 250, rather than both the AC to DC converter 151 and the DC to AC converter 154 of FIG. 1, the control of wind turbine 200 is more efficient than the control of wind turbine 100, which employs a DC link 152.

Referring to FIGS. 10 and 11, FIG. 10 is a schematic diagram of six switches and six diodes for a single output phase of the matrix converter in power converter 250. Each switch has a gate (not shown in FIG. 10) receiving a gate signal for turning the switch on or off. Commutation logic 930 controls the switches by sending a respective gate signal to each of the six gates, as well as the respective 12 gate signals for the other two phases. These eighteen gate signals thus control the matrix converter in power converter 250. When an ASIC is employed to handle phase commutations, the DSP will control less gate signals, e.g., just nine gate signals.

One or more logic devices, such as an application specific integrated circuit (ASIC), can be used to reduce the processing burden on a DSP in control system 700. For example, an ASIC that handles phase commutations can reduce the number of gate signals of the matrix converter to be controlled. Phase commutation can be explained with reference to FIGS. 10 and 11. The current $i_o$ of generator phase x is positive in accordance with the direction in FIG. 10 and drawn from grid phase "a", i.e. switch $S_{a1}$ is on and conducting and switch $S_{a2}$ is on and non-conducting (reverse biased). At some point in time, the modulator of FIG. 7 demands a new voltage vector to be applied on the rotor. For example, the modulator can command generator phase "x" be connected to grid phase "b" instead of grid phase "a." In order to avoid short circuiting the grid and to prevent instantaneously bringing the inductive generator current to zero (which would each damage the matrix converter), a safe phase commutation procedure has to be followed to shift (commutate) from grid phase "a" to grid phase "b." FIG. 11 illustrates a safe commutation procedure. The safe commutation provides a proper switching sequence. For example, the modulator orders a shift from switch state 11-00-00 to switch state 00-11-00. Accordingly, switch $S_{a2}$, which is non-conducting, should be turned off bringing the switch state to 10-00-00 (this is a soft switching since the current through the switch is zero and the voltage across the switch is almost zero). Next, the switch $S_{b1}$ is turned on and the switch state becomes 10-10-00 (If the voltage in grid phase "a" is higher than the voltage in grid phase "b" at the switching instant, the turn on of switch $S_{b1}$ becomes a soft turn-on, otherwise it is a hard turn-on). Next, the switch $S_{a1}$ is turned off and the switch state becomes 00-10-00 (If the voltage of grid phase "b" is higher than grid phase "a" at the switching instant, the turn-off of switch $S_{a1}$ becomes a soft turn-off, otherwise it is a hard turn-off). Finally, to complete the commutation procedure, switch $S_{b2}$ is turned on (which becomes a soft turn on).

FIG. 11 illustrates a four step algorithm for commutating switches between two arbitrary input phases and an output. The algorithm of FIG. 11 allows the matrix converter to use switches that do not have infinite switching times. If a special algorithm is not used, commutation between two input phases could result in a violation of the two basic control rules of a matrix converter: (1) a matrix converter is not allowed to make a short circuit to the supply grid, and (2) a matrix converter must always provide a current path for inductive generator current. Various commutation strategies have been proposed for a matrix converter, and the present invention can be implemented with any of these strategies. For example, R. R. Beasant, et al., "An Approach to Realization of a High Power Venturini Converter" 1 IEEE Power Electronics Specialists Conference 291–297 (Jun. 11, 1990), Nándor Burány, "Safe Control of Four-Quadrant Switches"

1 IEEE Industrial Application Society Annual Meeting 1190 (Oct. 1–5, 1989), Jung G. Cho and Gyu H. Cho, "Soft Switched Matrix Converter for High Frequency Direct AC-to AC Power Conversion" 4 EPE 4th European Conference on Power Electronics and Application 196–201 (1991), H. L. Hey, et al., "A New Soft-Switching AC-AC Matrix Converter, with a Single Actived Commutation Auxiliary Circuit" 2 IEEE Power Electronics Specialists Conference 965–970 (Jun. 18–22, 1995), B. H. Kwon, et al., "Novel Commutation Technique of AC-AC Converters" 145 IEE Proceedings on Electronic Power Application 295–300 (July 1998), and Charles L. Neft and Colin D. Schauder, "Theory and Design of a 30-HP Matrix Converter" IEEE Industrial Application Society Annual Meeting 248–253 (1988) all describe commutation strategies for a matrix converter, and each is incorporated herein by reference.

R. R. Beasant, et al. and Charles L. Neft describe the simplest commutation strategies, but these strategies do not comply with the basic control rules. Nándor Burány and B. H. Kwon each describe strategies to reduce switching losses by making half of the switching become soft switching. The strategies of Jung G. Cho and H. L. Hey require a more complex hardware structure for the matrix converter.

FIG. 11 shows a preferred commutation strategy consistent with the present invention. When the desired current $i_o$ is positive, the switching states shown in the left half of FIG. 11 are entered. When the desired current $i_o$ is negative, the switching states in the right half are entered. The switching states in the shadowed boxes are transitional states while the switching states in the white boxes are the stationary states.

For example, current $i_o$ can be drawn from input phase a in one condition. In this stationary state, both switches $S_{a1}$ and $S_{a2}$ are turned on, i.e., the stationary switch state is 11-00-00. At an arbitrary time, having positive current $i_o$, according to FIG. 8, the modulator demands a commutation from input phase a to input phase b. According to FIG. 12, the non-conducting switch $S_{a1}$ is turned off and then the switch state is 10-00-00. Then, $S_{b1}$ is turned on and input phase b is able to conduct the current. The switch state is 10-10-00. Then, switch $S_{a1}$ turns off and $S_{b2}$ is finally turned on to complete the four-step commutation procedure.

Based on this framework of how switching occurs, modulator 730 creates switching commands based on voltage references $u_{ra\_ref}$ and $u_{rb\_ref}$. Various modulation strategies are known. These strategies can be divided into five categories: (1) the direct transfer function, (2) the indirect transfer function, (3) carrier-based modulation, (4) space vector modulation, and (5) indirect space vector modulation.

Marco Venturini, "A New Sine Wave In, Sine Wave Out Conversion Technique Eliminates Reactive Elements" Powercont. P. E3-1–E3-15 (1980) (incorporated herein by reference) describes a direct transfer function approach. Modulation is based on solving the matrix equation using a sinusoidal reference for the input current and the output voltage. This approach, however, restricts the output voltage to 0.5 times the input voltage. The voltage transfer ratio can be increased to 0.866 times the input voltage by adding a harmonic component to the output reference voltage. See Alberto Alesina and Marco Venturini, "Intrinsic Amplitudes and Optimum Design of Direct PWM AC-AC Converters" IEEE Power Electronics Specialists Conference 1284–1291 (1988) (incorporated herein by reference). While the direct transfer function approach incorporates many desirable properties, i.e., maximum voltage transfer ratio, sinusoidal input/output, and adjustable power factor, the formulas for the computation of duty cycles are complicated and require considerable computational power to achieve real time implementation. See L. Zhang and C. Watthanasam, "An Efficient Space Vector Modulation Algorithm for AC-AC Matrix Converters" IEE Power Electronics and Variable Speed Drives 108–113, (Sep. 21–25, 1996) (incorporated herein by reference). In addition, the switching losses associated with this method are relatively high due to a high number of switch commutations per switching cycle. See C. Watthanasam et al., "Analysis and DSP-Based Implementation of Modulation Algorithms for AC-AC Matrix Converters" 2 IEEE Power Electronics Specialists Conf. 1053–1058 (Jun. 21–27, 1996) (incorporated herein by reference).

Y. Kim and M. Ehsani, "Control of Force-Commutated Direct Frequency Changers" IEEE Industrial Application Society Annual Meeting 1163–1170 (1990) (incorporated herein by reference) and Charles L. Neft and Colin D. Schauder, "Theory and Design of a 30-HP Matrix Converter" IEEE Industrial Application Society Annual Meeting 248–253 (1988) (incorporated herein by reference) each describe an indirect transfer function approach. In this approach, the matrix converter is theoretically separated into a rectifier part and an inversion part, which are modulated separately. Compared to the direct transfer function approach, the indirect transfer function approach requires less computational power. See L. Huber and D. Borojevic, "Space-Vector Modulated Three-Phase to Three-Phase Matrix Converter with Input Power Factor Correction" –IEEE transactions on industry applications. No. 6, 1234–1246 (November/December 1995) (incorporated herein by reference).

Y. Kim and M. Ehsani, "New Modulation Methods for Force-Commutated Direct Frequency Changers" IEEE Power Electronics Specialists Conference 798–809 (1989) (incorporated herein by reference) and J. Oyama et al., "Effect of PWM Pulse Number on Matrix Converter Characteristics" 2 IEEE Power Electronics Specialists Conference 1306–1311 (Jun. 23–27, 1996) (incorporated herein by reference) each describe a carrier-based modulation approach. From applications in modulation of conventional converters, carrier-based modulation was adapted for use in matrix converters. Implementations can mainly focus on modulation of the output voltage to provide relatively simple modulation, or can also include modulation of the input current.

D. G. Holmes and T. A. Lipo, "Implementation of a Controlled Rectifier Using AC-AC Matrix Converter Theory" IEEE Power Electronics Specialists Conference 353–359 (1989) (incorporated herein by reference), P. Nielsen, D. Casadei, G. Serra and A. Tani, "Evaluation of the Input Current Quality by Three Different Modulation Strategies for SVM Controlled Matrix Converters with Input Voltage Unbalance" 2 IEEE International Conference on Power Electronics, Drives and Energy Systems for Industrial Growth, 794–800 (January 1996) (incorporated herein by reference), and D. O. Neascu, "Theory and Design of a Space-Vector Modulator for AC-AC Matrix Converter" 5 European Transactions on Electrical Power Engineering No. 4, 285–290 (July/August 1995) (incorporated herein by reference) describe space vector modulation. Both the space vector modulation approach and the indirect space vector modulation approach only use stationary vectors. The stationary vectors correspond to switch combinations where at least two of the generator phases are connected to one grid phase.

Lázló Huber and Dusan Borojevic, "Space Vector Modulation with Unity Input Power Factor for Forced Commutated Cycloconverters" IEEE Industrial Application Society Annual Meeting 1032–1041 (1991) (incorporated herein by reference) describe indirect space vector modulation, as did L. Huber and Borojevic, supra, and D. O. Neascu, supra. In one sense, indirect space vector modulation is the combination of principles from the indirect transfer function approach with principles from space vector modulation. In indirect space vector modulation, SVM is performed individually for rectification and inversion. In space vector modulation, the number of switchings is preferably optimized to achieve lower switching losses. See P. Nielsen and F. Blaabjerg and J. K. Pedersen; "Space vector modulated matrix converter with minimized number of switchings and a feedforward compensation of input voltage unbalance" IEEE international conference on power electronics, drives and energy systems for industrial growth, Vol. 2, pp. 833–839, January, 1996.

Hardware Interface and Protection Circuitry

Figure 14:
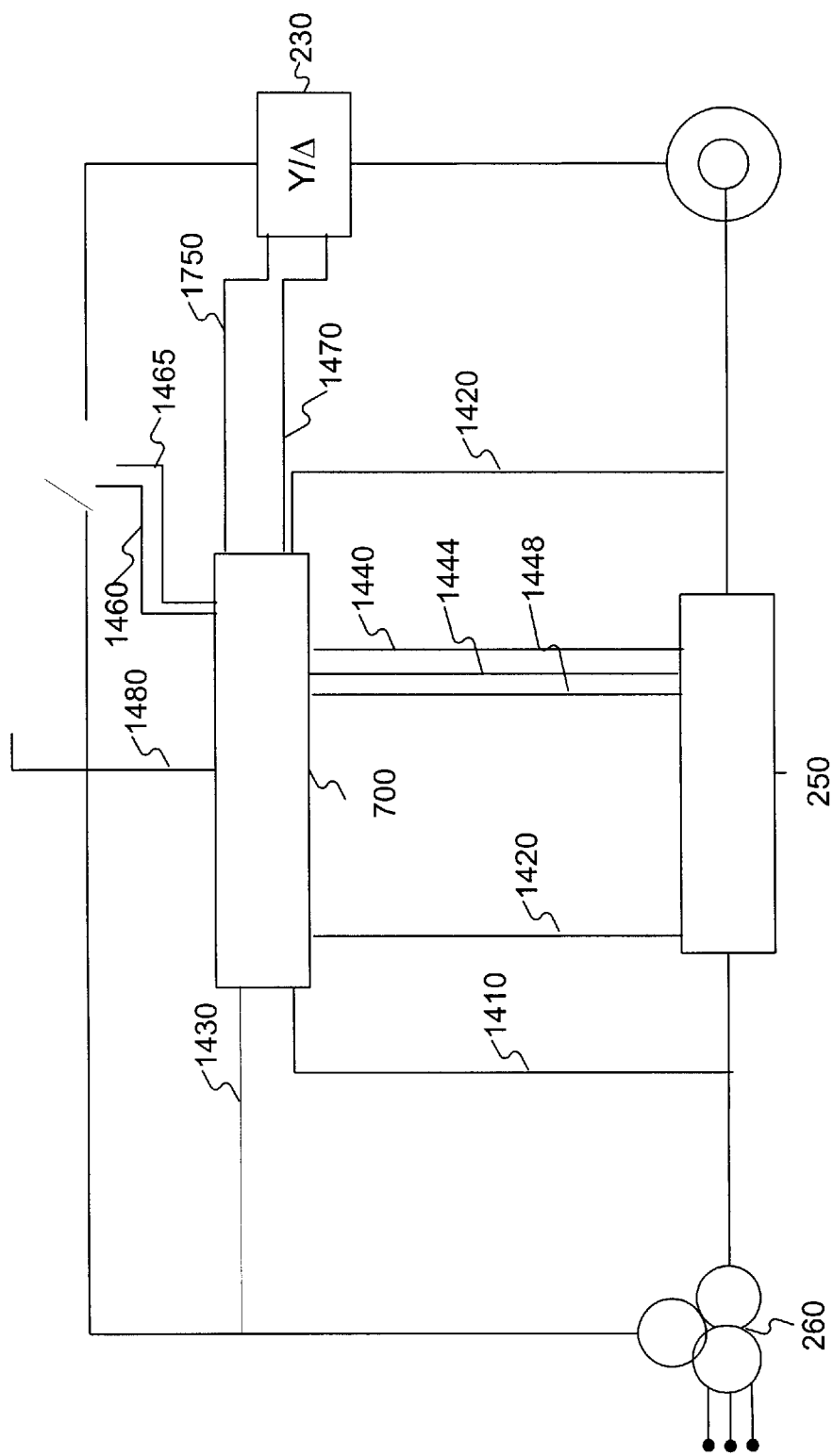
FIG. 14 illustrates implementing control system 700 using various analog and digital signals.

FIG. 14 illustrates implementing control system 700 using various analog and digital signals. The analog signals should include three measurements of the supply grid voltage (12 bit) 1410, three measurements of the rotor phase current (12 bit) 1420, and three measurements of the supply grid current (12 bit) 1430. The digital signals include eighteen over voltage protection signals 1440, eighteen overcurrent protection signals 1444, eighteen overtemperature protection signals (one per switch) 1448, eighteen gate signals (only nine from the microprocessor when an ASIC is used) 1450, an on/off signal 1460 and a feedback signal 1465 used in coupling the stator and the supply grid, a signal to control the Y, Δ converter 1470, a feedback signal from the Y, Δ converter 1475, and digital encoder signals 1480.

As a reference, for a 850 kW system, a nominal rotor current can be 300 A. For a 2 MW system, the rotor current can be 800 A. At each of these power levels, the nominal rotor voltage at 100% slip can be 1850 V. The overcurrent and over voltage protection signals should be designed to be triggered in accordance with these values. Of course, these values are only examples, and the values would vary for different generator constructions.

Due to the removal of a DC-link from the present invention, there is no decoupling between the input and output of the matrix converter. In ideal designs, this is not a problem. In the case of unbalanced or distorted input voltages (or unbalanced loads), however, the input current and the output voltage will be distorted. Several papers have dealt with the problems of unbalanced input voltages. For example, D. Casadei et al., "Analysis of Space Vector Modulated Matrix Converters Under Unbalanced Supply Voltages" Symposium on Power Electronics, Electrical Drives, Advanced Electrical Motors, 39–44 (Jun. 8–10, 1994), D. Casadei, et al., "Reduction of the Input Current Harmonic Content in Matrix Converter Under Input/Output Unbalance" 1IEEE International Conference on Industrial Electronics, Control and Instrumentation 457–462 (Nov. 9–14, 1995), D. Casadei, et al., "Performance of SVM Controlled Matrix Converter with Input and Output Unbalanced Conditions" 2 EPE 6th European Conference on Power Electronics and Applications 628–633 (Sep. 19–21, 1995), D. Casadei, et al., "A General Approach for the Analysis of the Input Power Quality in Matrix Converters" 2 IEEE Power Electronics Specialists Conference 1128–1134 (Jun. 21–27, 1996), P. Enjeti and X. Wang, "A Critical Evaluation of Harmonics Generated by Forced Commutated Cycloconverters (FFC's) under Unbalance" IEEE Industrial Application Society Annual Meeting 1162–1166 (1990), Peter Nielsen, "The Matrix Converter for an Induction Motor Drive." Ph.D. thesis, Aalborg University (August 1996), Nielsen et al., supra, Jun Oyama et al., "Displacement Angle Control of Matrix Converter" 2 IEEE Power Electronics Specialists Conference 1033–1039 (Jun. 22–27, 1997), and L. Zhang et al. "Analysis and Comparison of Control Techniques for AC-AC Matrix Converters" 145 IEE Proceedings on Electronic Power Application 284–294 (July 1998) describe strategies with various engineering trade-offs (input disturbance, line losses, controllability of the input power factor, etc.).

The wind turbines discussed above also provide protection to the matrix converter in fault situations. The snubber circuit 1710 is described in Nielsen, supra. FIG. 13 illustrates a configuration to protect matrix converter 250.

The protection of the matrix converter consists of a rotor circuit clamp 1700 and a snubber circuit 1710. The snubber 1710 acts as a diode clamp circuit across the matrix converter. This snubber performs two different functions. In normal operation, snubber 1710 clamps any over voltages across the switches in the matrix converter. Over voltages typically are caused by current changes across the leakage inductances of the power switch matrix during commutation. When the matrix converter receives an error signal, all the switches in the matrix converter are turned off. This action violates one of the basic control rules of the matrix converter, by interrupting the inductive generator current. If no current path is provided for this inductive current) the voltage across the switches in the matrix converter increases and the converter will be damaged. By inserting the diode snubber clamp, the diodes provide an alternative current path. Therefore, in a fault situation, the clamp circuit or snubber performs the additional function of absorbing the energy in the leakage inductances of the rotor circuit and the energy in the rotor filter.

Circuit 1720 in FIG. 13 can be designed as two diode bridges sharing a minor common capacitor 1730. After grid connection of the converter, capacitor 1730 is charged to the rectified grid voltage. Also, during grid failure, the voltage across the rotor windings can be high, causing damaging currents and voltages for the matrix converter. To prevent damage to the matrix converter, an over voltage protection circuit (OVP) 1700 acts as a rotor voltage clamp. In case of a grid failure, the switch (shown as thyristor 1710 in FIG. 13) clamps the rotor voltage until the stator is disconnected from the supply grid, and the rotor currents are zero. Papers, such as P. Nielsen, F. Blaabjerg, J. K. Pedersen, "Novel solutions for protection of matrix converter to three phase induction machine" *IEEE Industry Applications Conference* 1447–1454 (1997), have dealt with the problems of retaining control after a grid failure or disturbance, but have not discussed protecting matrix converter in doubly fed induction generating system from over voltages.

This entire protection circuit requires inclusion of eighteen additional diodes, DC-link capacitor 1730, and switch 1710. The DC-link capacitor does not significantly impact the mean-time-between-failures for the wind turbine, since this DC-link capacitor is much smaller than the DC-link capacitor of FIG. 1. This DC-link capacitor voltage in the clamp circuit can be used as a power supply for the controller of the matrix converter. During a power grid disturbance, the DC-link capacitor can be energized from the energy stored in the generator to maintain the controller circuits active (as shown in FIG. 13) and when the grid disturbance ends, the matrix converter will be able to resume control of the generator. This back up of the controller for the matrix converter enables the controller to operate the generator immediately after a disturbance has ended. This is an important feature for a grid connected wind turbine.

D. Conclusion

Wind turbines using matrix converters are described above. These wind turbines operate at high power and can provide reliable alternatives to fossil fuel generation of electricity for a utility grid.

While there has been illustrated and described what are at present considered to be a preferred implementation and method of the present invention, it will be understood by those skilled in the art that various changes and modifications may be made, and equivalents may be substituted for elements thereof, without departing from the true scope of the invention. Modifications may be made to adapt a particular element, technique, or implementation to the teachings of the present invention without departing from the spirit of the invention.

Also, the foregoing description is based on a client-server architecture, but those skilled in the art will recognize that a peer-to-peer architecture may be used consistent with the invention. Moreover, although the described implementation includes hardware and software, the invention may be implemented in hardware or software alone. Additionally, although aspects of the present invention are described as being stored in the memory of a microprocessor system, one skilled in the art will appreciate that these aspects can also be stored on other types of computer-readable media, such as secondary storage devices (e.g., hard disks, floppy disks, CD-ROM); a carrier wave from the Internet; or other forms of RAM or ROM.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A variable speed wind turbine, comprising:
   a turbine rotor including at least one blade mounted to a rotatable turbine shaft;
   an induction generator having a stator and a rotor coupled to the turbine shaft for rotation therewith;
   a matrix converter including an array of switching elements;
   a matrix converter control unit to control the switching elements; and
   a protection circuit for protecting the matrix converter against over voltages.

2. A turbine according to claim 1, having a voltage gradient limiting circuit located between the matrix converter and the generator rotor.

3. A turbine according to claim 2, wherein the voltage gradient limiting circuit includes an inductance.

4. A turbine according to claim 2, wherein the voltage gradient limiting circuit includes an inductance capacitor filter.

5. A turbine according to claim 1, including a transformer with at least three windings including a tertiary winding; and
   means for adjusting voltage at the tertiary winding, wherein a ratio of the input potential to the output potential is greater than 0.866.

6. A turbine according to claim 1, including a generator with a winding ratio; and means for adjusting the winding ratio of the generator wherein a reduced matrix converter gain is overcome, wherein a ratio of the input potential to the output potential is greater than 0.866 and whereby a current rating of the switching elements is increased.

7. A turbine according to claim 1, having a protection circuit for protecting the matrix converter against over voltages and for retaining control after a grid disruption.

8. A turbine of claim 1, having means for position sensorless detection of the position of said turbine rotor.

9. A turbine according to claim 8, further including the measurement of the current of said rotor.

10. A turbine according to claim 8, further including the circulation of reactive power.

11. A turbine according to claim 1, having a power controller for circulating reactive energy.

12. A turbine according to claim 1, having a power controller for controlling the power factor of the turbine without impacting the circulation of reactive power.

13. A turbine according to claim 1, wherein at least one of said switching elements comprises a standard H-Bridge module.

14. A turbine according to claim 1, wherein said stator further includes a stator winding means for shifting between a Y-connection and a $\Delta$-connection.

15. A turbine according to claim 1, which further includes a means for the facilitating the active damping of current harmonics.

16. A turbine according to 1, which further includes a means for facilitating the active damping of resultant drive-train oscillations.

17. A turbine according to claim 1, wherein the induction generator is a doubly-fed induction generator.

18. A method for a variable speed wind turbine comprising:
   supplying power from an induction generator to a power grid using a matrix converter including using a protection circuit for protecting the matrix converter from over voltages.

19. The method of claim 18, wherein the protection circuit retains control of the matrix converter after grid disruption.

20. The method of claim 18, wherein the power is supplied from a doubly-fed induction generator.

* * * * *